United States Patent
Aoyama et al.

(10) Patent No.: US 6,967,637 B2
(45) Date of Patent: Nov. 22, 2005

(54) LIQUID CRYSTAL DISPLAY APPARATUS USING IPS DISPLAY MODE WITH HIGH RESPONSE

(75) Inventors: Tetsuya Aoyama, Kawagoe (JP); Kenji Okishiro, Kokubunji (JP); Katsumi Kondou, Mito (JP); Tsunenori Yamamoto, Hitachi (JP); Shinichi Komura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 518 days.

(21) Appl. No.: 10/151,170

(22) Filed: May 21, 2002

(65) Prior Publication Data

US 2003/0043098 A1 Mar. 6, 2003

(30) Foreign Application Priority Data

Aug. 30, 2001 (JP) ........................................ 2001-261744

(51) Int. Cl.[7] .............................. G09G 3/18; G09G 3/36
(52) U.S. Cl. ............................................ 345/94; 345/89
(58) Field of Search .......................... 345/89, 690, 102, 345/94, 92

(56) References Cited

U.S. PATENT DOCUMENTS 5,465,102 A * 11/1995 Usui et al. ..................... 345/89
5,990,994 A    11/1999 Stephenson ................... 349/106
6,111,627 A     8/2000 Kim et al. ..................... 349/141
2002/0003522 A1 *  1/2002 Baba et al. ...................... 345/89

FOREIGN PATENT DOCUMENTS

JP        2001-174820           6/2001

* cited by examiner

Primary Examiner—Xiao Wu
Assistant Examiner—Kevin M. Nguyen
(74) Attorney, Agent, or Firm—Antonelli, Terry, Stout & Kraus, LLP.

(57) ABSTRACT

A liquid crystal display apparatus including: a first substrate; a second substrate arranged opposite the first substrate; and a liquid crystal layer held between the first substrate and the second substrate; further provided with a plurality of scanning lines arranged over the first substrate; signal lines arranged over the first substrate to cross the scanning lines; pixels each composed matching an area surrounded by the scanning lines and the signal lines; pixel electrodes arranged over the first substrate and matching the signal lines; and common electrodes arranged over the first substrate and matching the pixel electrodes, wherein at least either of the first substrate and the second substrate is provided with unevenness to vary the thickness of the liquid crystal layer in the light-transmissive regions of the same ones of the pixels.

6 Claims, 41 Drawing Sheets

31  33  35  36     36  32  86

LIQUID CRYSTAL DISPLAY APPARATUS USING IPS DISPLAY MODE WITH HIGH RESPONSE

CROSS-REFERENCE TO RELATED APPLICATIONS

The present invention is related to U.S. patent application Ser. No. 10/098,075 filed Mar. 15, 2002 entitled "LIQUID CRYSTAL DISPLAY APPARATUS USING IPS DISPLAY MODE WITH HIGH NUMERICAL APERTURE" claiming the Conventional Priority based on Japanese Patent Application No. 2001-259571.

BACKGROUND OF THE INVENTION

The present invention relates to a liquid crystal display apparatus having a novel configuration.

Liquid crystal display apparatuses according to the prior art use a display mode in which an electric field substantially normal to the substrate surface is applied, as typically presented by the twisted nematic (TN) display mode. However, the TN display mode involves the problem of an insufficient viewing angle characteristic.

On the other hand, the In-Plane Switching (IPS) display mode is proposed in JP-B-63-21907, U.S. Pat. No. 4,345,249, WO 91/10936, JP-A-6-160878 and others specifications.

In this IPS display mode, an electrode for driving a liquid crystal is formed one of paired substrates holding the liquid crystal between them, and an electric field having a component parallel to the substrate surface is applied to the liquid crystal. This IPS display mode can provide a wider viewing angle than the TN display mode does.

However, the IPS display mode also involves the problem that the color gray scale varies with the visual angle. In order to solve this problem stated, JP-A-9-258269 or the like specifications among others proposes a multi-domain IPS display mode. A liquid crystal display apparatus using this multi-domain IPS display mode will be described with reference to FIG. 2, FIG. 3 and FIG. 4.

FIG. 2 illustrates the configuration of a liquid crystal display apparatus using a multi-domain IPS display mode. The liquid crystal display apparatus has a signal driver 51 for supplying a signal voltage to each pixel electrode 35, a scanning driver 52 for supplying a voltage for selecting a pixel, a common electrode driver 54 for supplying a voltage to each common electrode 36, and a display control unit 53 for controlling the signal driver 51, the scanning driver 52 and the common electrode driver 54.

The substrate 1 is provided with a plurality of scanning lines 32 connected to the scanning driver 52, signal lines 31 connected to the signal driver 51 and crossing the scanning lines 32, first TFTs 33 arranged in a matching way near the intersections between the scanning lines 32 and the signal lines 31 and electrically connected to the scanning lines 32 and the signal lines 31, the pixel electrodes 35 electrically connected to the first TFTs 33 and matching the signal lines 31, the common electrodes 36 matching the pixel electrodes 35, and electrode connecting portions 36' electrically connected to the common electrodes 36 and the common electrode driver 54.

A pixel 11 is formed in each area surrounded by signal lines 31 and scanning lines 32, and a plurality of pixels 11 constitute a display section 22.

FIG. 3 illustrates the configuration of a circuit arrangement pattern in a pixel and its vicinity in a liquid crystal display apparatus using a multi-domain IPS display mode. The scanning lines 32 and the signal lines 31 cross each other, and a pixel 11 is formed matching an area surrounded by scanning lines 32 and signal lines 31. Each of the first TFTs 33 is arranged in a matching way near the intersection between a scanning line 32 and a signal line 31, and electrically connected to the scanning line 32, the signal line 31 and the pixel electrode 35. Each of the common electrodes 36 is arranged matching a pixel electrode 35, and the common electrode 36 and the pixel electrode 35 generate an electric field whose components are parallel to the substrate surface. The pixel electrode 35, the common electrode 36 and the signal line 31 are bent once or more within each pixel to constitute a multi-domain. The turning direction of the liquid crystal is reversed in each domain to that in the adjoining domain to expand the visual angle.

FIG. 4 shows an A–A' section of FIG. 3. This configuration has a substrate 1 made of transparent glass, another substrate 2 arranged opposite the substrate 1 and also made of transparent glass, and a liquid crystal layer 34 held between the substrates 1 and 2. The substrate 1 has a common electrode 36, a signal line 31 arranged in a higher layer than the common electrode 36 with a first insulating film 81 in-between, pixel electrodes 35 matching the common electrode 36 generating an electric field whose components are parallel to the surface of the substrate 1, a protective film 82 provided over the pixel electrodes 35, an alignment film 85 provided over the protective film 82, and a polarizer 6 provided on the other side than the liquid crystal side of the substrate 1 and varying its optical characteristics according to the alignment of the liquid crystal.

The substrate 2 has a light shielding film 5 for shielding against unnecessary lights from gaps; a color filter 4, provided over the light shielding film 5, for expressing colors respectively corresponding to R, G and B; a flattening film 3, provided over the color filter 4, for flattening the unevenness of the filter, an alignment film 85 provided over the flattening film 3, and a polarizer 6 provided over the other side than the liquid crystal side of the substrate 2.

The alignment film 85 is rubbed to align the liquid crystal. The rubbing direction is parallel to the extending direction DLa of the signal line. The angle formed between one side of the bent pixel electrode and the rubbing direction is 15 degrees, matching the IPS display mode. The axis of transmission of the polarizer 6 is either parallel or normal to the rubbing direction of the alignment film on the substrate over which that particular polarizer is arranged, and the polarizer of the substrate 1 and the polarizer of the substrate 2 are in a cross Nicol arrangement, matching the normally black mode.

Picture displaying is accomplished by supplying an electric field whose components are parallel to the substrate 1 onto the liquid crystal 34 with the common electrodes 36 and the pixel electrodes 35 and thereby rotating the liquid crystal 34 in a plane substantially parallel to the substrate 1.

SUMMARY OF THE INVENTION

Nowadays, liquid crystal display apparatuses are expected to be not only as monitors of personal computers (PCs) but also as liquid crystal television receivers compatible with moving pictures. To be useful as a liquid crystal television receiver, a liquid crystal display apparatus using an IPS display mode having a wide visual angle is likely to prove suitable so that a plurality of persons can comfortably watch at the same time. For such a liquid crystal display apparatus using an IPS display mode to be able to display moving pictures more beautifully, the liquid crystal is required to be quicker in response. Furthermore, the IPS display mode involves the problem of color gray scale variation with the drive voltage, and this problem should also be solved. Another problem which has come to be pointed in recent years is the blurred contours of moving images displayed on a liquid crystal display apparatus.

Therefore, a first object of the present invention is to quicken the response of liquid crystals with a novel pixel structure.

A second object of the invention is to provide a liquid crystal display apparatus immune from color gray scale variations due to the drive voltage.

A third object of the invention is to provide a liquid crystal display apparatus with clear contours of moving images.

The objects stated above are attained by the following means.

(1) The invention as set forth in claim 1 is a liquid crystal display apparatus including: a first substrate; a second substrate arranged opposite the first substrate; and a liquid crystal layer held between the first substrate and the second substrate; further provided with:

a plurality of scanning lines arranged over the first substrate;

signal lines arranged over the first substrate to cross the scanning lines;

pixels each composed matching an area surrounded by the scanning lines and the signal lines;

pixel electrodes arranged over the first substrate and matching the signal lines;

common electrodes arranged over the first substrate and matching the pixel electrodes;

first active elements arranged matching intersections between the scanning lines and the signal lines, and electrically connected to the signal lines, the scanning lines and the pixel electrodes; and an insulating film arranged over the first substrate, wherein:

at least either of the first substrate and the second substrate is provided with unevenness to vary the thickness of the liquid crystal layer in the light-transmissive regions of the same ones of the pixels.

(2) In the liquid crystal display apparatus set forth in (1):

the unevenness is intentionally formed for the purpose of quickening the response of the liquid crystal. Thus, a step of forming concaves and convexes is added to the usual manufacturing process for liquid crystal display apparatuses.

(3) In the liquid crystal display apparatus set forth in (1) or (2):

the unevenness is formed of insulating films.

(4) In the liquid crystal display apparatus set forth in (3):

the insulating films are constituted of a first insulating film formed over the first substrate; a protective film formed over the first film and over at least either of the common electrodes or the pixel electrodes to insulate and protect them, and a second insulating film formed over the protective film, wherein the unevenness is formed of the second insulating film.

(5) In the liquid crystal display apparatus set forth in any of (1) through (4):

ratios in square measure between concave and convex portions of the liquid crystal layer in the light-transmissive regions and the average heights of the unevenness in individual ones of the pixels are equal.

(6) In the liquid crystal display apparatus set forth in any of (1) through (5):

there is only one level gap attributable to the unevenness between the pixel electrodes and the common electrodes.

(7) In the liquid crystal display apparatus set forth in (6):

the pixel electrodes are superposed over either the concaves or convexes constituting the unevenness, and the common electrodes are superposed over those of the concaves or convexes over which the pixel electrodes are not superposed.

(8) In the liquid crystal display apparatus set forth in any of (1) through (7):

the unevenness is formed over the first substrate.

(9) In the liquid crystal display apparatus set forth in (8):

at least some of the pixel electrodes and the common electrodes are arranged in a higher layer than the insulating film constituting the unevenness.

(10) In the liquid crystal display apparatus set forth in any of (1) through (7):

the unevenness is formed over the second substrate.

(11) In the liquid crystal display apparatus set forth in any of (1) through (10):

the unevenness is arranged in stripes or in a zigzag shape, and the extending direction of the unevenness deviates from the extending direction of the pixel electrodes or of the common electrodes.

(12) In the liquid crystal display apparatus set forth in any of (1) through (10):

the unevenness is in stripes, and the extending direction of the level gap attributable to the unevenness is identical with the initial orientation of the liquid crystal.

(13) In the liquid crystal display apparatus set forth in any of (1) through (12):

at least one of the signal lines, the scanning lines, the pixel electrodes and the common electrodes does not ride over the level gap attributable to the unevenness.

(14) In the liquid crystal display apparatus set forth in any of (1) through (13):

at least part of the level gap attributable to the unevenness is superposed over the pixel electrodes or the common electrodes.

(15) In the liquid crystal display apparatus set forth in any of (1) through (14):

at least some of the signal lines and the common electrodes are superposed via the insulating film constituting the unevenness.

(16) In the liquid crystal display apparatus set forth in (15):

the insulating film is selectively formed in a smaller width than the common electrodes in the part where the signal lines and the common electrodes are superposed.

(17) In the liquid crystal display apparatus set forth in (15) or (16):

an alignment film for aligning the liquid crystal layer is arranged in contact with the liquid crystal layer, the common electrode and the alignment film are arranged over the insulating film in the part where the signal lines and the insulating film are superposed, and the common electrodes are superposed over part of the signal lines. Thus, the capacitance between the common electrodes and signal lines can be controlled by providing slits in the common electrodes.

(18) In the liquid crystal display apparatus set forth in any of (1) through (17):

the insulating film constituting the unevenness is arranged over at least some of the signal lines and the scanning lines.

(19) In the liquid crystal display apparatus set forth in any of (4) through (18):

apart from the second insulating film constituting the unevenness, the protective film having unevenness is arranged over the first substrate, and convexes of the second insulating film are superposed over concaves of the protective film.

(20) The liquid crystal display apparatus set forth in any of (1) through (19) further including:

means for equalizing the voltage of the pixel electrodes and the voltage of the common electrodes within one cyclic period of displaying one picture.

(21) In the liquid crystal display apparatus set forth in (20):

the scanning lines are scanned twice in the one period, the pixel electrodes are supplied in either round of the scanning with the same voltage as that for the common electrode, and a voltage for displaying a picture is supplied to the pixel electrodes in the other round of the scanning.

(22) In the liquid crystal display apparatus set forth in (20) further including:

second active elements electrically connected to different scanning lines from the scanning lines to which the first active elements are connected, the pixel electrodes and the common electrodes, wherein the voltage of the pixel electrodes and the voltage of the common electrodes are equalized in the one period.

(23) The liquid crystal display apparatus set forth in any of (20) through (22) further including:

a light source, wherein, after equalizing the voltage of the pixel electrodes and the voltage of the common electrodes in the one period, the scanning lines are scanned and, after a voltage for displaying picture is applied to the pixel electrodes, the light source is turned on.

(24) In the liquid crystal display apparatus set forth in any of (1) through (23):

a layer of a photosensitive material is arranged in at least part of the area in contact with the liquid crystal layer.

(25) A liquid crystal display apparatus including: a light source; a first substrate; a second substrate arranged opposite the first substrate; and a liquid crystal layer held between the first substrate and the second substrate; further provided with: a plurality of scanning lines arranged over the first substrate; signal lines arranged over the first substrate to cross the scanning lines; pixels each composed matching an area surrounded by the scanning lines and the signal lines; pixel electrodes arranged over the first substrate and matching the signal lines; common electrodes arranged over either the first substrate or the second substrate and matching the pixel electrodes; first active elements arranged matching intersections between the scanning lines and the signal lines and electrically connected to the signal lines, the scanning lines and the pixel electrodes; and an insulating film arranged over the first substrate, wherein: a voltage for displaying a picture is applied to every one of the pixel electrodes by successively applying pulse voltages to the scanning lines in one cyclic period of displaying one picture, and, after having the voltage held for a fixed period, the light source is turned on; further provided with: a state regulating unit for keeping shorter than the fixed period the maximum length of response time to reach any of different gray scales from the state immediately before the application of any pulse voltage to the liquid crystal of the pixel matching the scanning line to which a pulse voltage is applied last in the one period.

Since a voltage for displaying a picture is properly applied to every one of the pixel electrodes in a fixed period before the light source is turned on, the contour of the moving picture is made clear.

(26) In the liquid crystal display apparatus set forth in (26):

the state regulating unit applies the same voltage to every one of the pixel electrodes before successively applying the pulse voltage to the scanning lines.

By applying in advance the same voltage to every pixel electrode, the maximum length of response time to reach any of different gray scales from the state immediately before the application of the pulse voltage to the liquid crystals around each pixel electrode is kept shorter than the fixed period. For instance, if the fixed period is 5 ms, that state may be a gray scale close to 0, or if the fixed period is 6 ms, the state may be a gray scale between 0 and 63.

(27) In the liquid crystal display apparatus set forth in (25) or (26):

the state regulating unit equalizes the voltage of the pixel electrodes and the voltage of the common electrodes before successively applying the pulse voltage to the scanning lines.

If the fixed period is 5 ms, that voltage to be applied may be one matching a gray scale close to 0, or if the fixed period is 6 ms, the voltage may be one matching a gray scale between 0 and 63.

(28) A driving method for the liquid crystal display apparatus set forth in (25) having:

a light source; a first substrate; a second substrate arranged opposite the first substrate; and a liquid crystal layer held between the first substrate and the second substrate; further provided with:

a plurality of scanning lines arranged over the first substrate; signal lines arranged over the first substrate to cross the scanning lines; pixels each composed matching an area surrounded by the scanning lines and the signal lines; pixel electrodes arranged over the first substrate and matching the signal lines; common electrodes arranged over either the first substrate or the second substrate and matching the pixel electrodes; first active elements arranged matching intersections between the scanning lines and the signal lines and electrically connected to the signal lines, the scanning lines and the pixel electrodes; and an insulating film arranged over the first substrate, wherein:

a voltage for displaying a picture is applied to every one of the pixel electrodes by successively applying pulse voltages to the scanning lines in one cyclic period of displaying one picture and, after having the voltage held for a fixed period, the light source is turned on; comprising the step of:

successively applying pulse voltages to the scanning lines after regulating the state to keep shorter than the fixed period the maximum length of response time to reach any of different gray scales from the state immediately before the application of any pulse voltage to the liquid crystal of the pixel matching the scanning line to which a pulse voltage is applied last in the one period.

(29) The driving method for the liquid crystal display apparatus set forth in (28), whereby:

the state regulation is accomplished by applying the same voltage to every one of the pixel electrodes before successively applying the pulse voltages the scanning lines.

(30) The driving method for the liquid crystal display apparatus set forth in either (28) or (29), whereby:

the state regulation is accomplished by equalizing the voltage of the pixel electrodes and the voltage of the common electrodes before successively applying the pulse voltages to the scanning lines.

Incidentally in any conventional liquid crystal display apparatus, even if there is a level gap, that will be a residual level gap left over from the formation of an electrode, a contact hole or a light shield film, but no intentionally formed one to reduce the response time of liquid crystals as described in the specification of the present application.

According to the invention, as switching begins first from the region where the liquid crystal layer is thicker when an electric field is applied, the switching the response time of liquid crystals from the zero gray scale to an intermediate gray scale can be reduced and, at the same time, color gray scale changes with variations in drive voltage can be restrained. Moreover, the contour of the moving picture can be displayed clearly.

Other objects, features and advantages of the invention will become apparent from the following description of the embodiments of the invention taken in conjunction with the accompanying drawings.

DETAILED DESCRIPTION OF THE EMBODIMENTS

Figure 4:
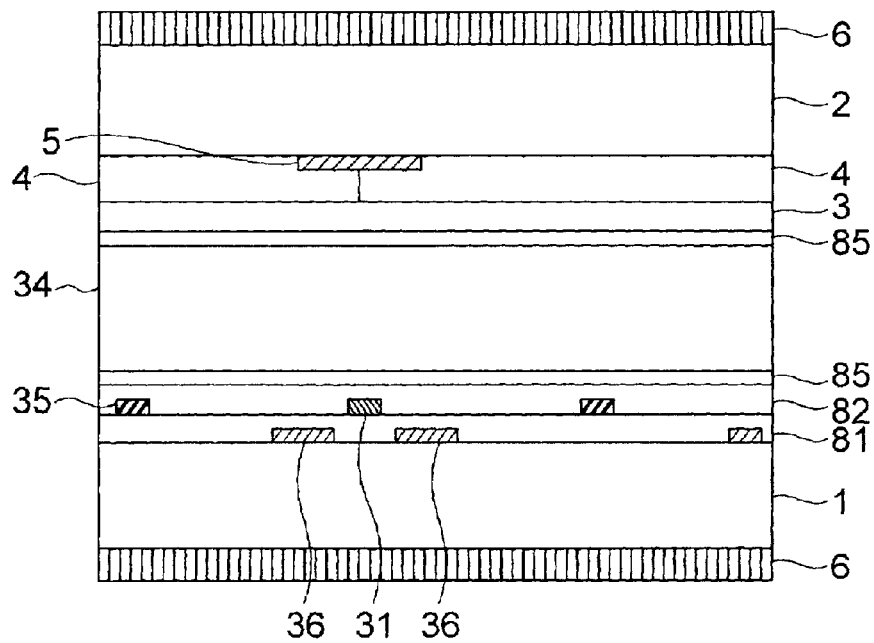
FIG. 4 illustrates a configuration of a pixel and its vicinity in a section of the conventional liquid crystal display apparatus.
Figure 6A:
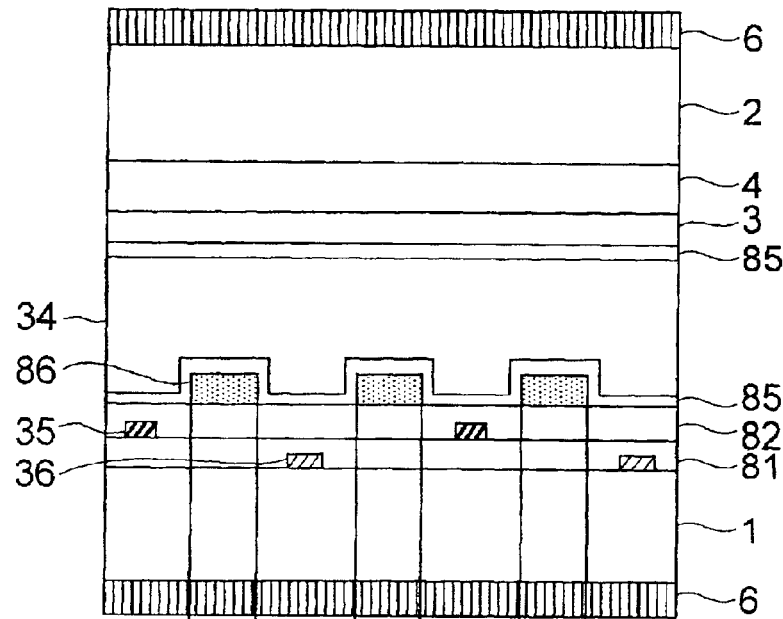
FIGS. 6A and 6B illustrate a principle of response quickening by an unevenness of a the liquid crystal layer.

In a liquid crystal display apparatus using a multi-domain IPS display mode according to the prior art, the thickness of the liquid crystal layer 34 is substantially constant as shown in FIG. 4. It has been found that the response time of the liquid crystal can be shortened by varying the thickness of this liquid crystal layer as shown in FIG. 6A. The configuration embodying the principle illustrated in FIG. 6A differs from that shown in FIG. 4 only in that the surface is made uneven by selectively arranging second insulating films 86 provided over the protective film 82. The principle which explains the quickening effect of this arrangement will be described below.

The threshold voltage ($V^{th}$) of realignment in a liquid crystal in an IPS display mode can be generally expressed in the following Equation (1):

$$V_{th} = (\pi \cdot L/d) \cdot [K_2/(\in_o \cdot |\Delta \in|)]^{1/2} \qquad (1)$$

where L represents the gap between electrode; d, the thickness of the liquid crystal layer; $K^2$, the elastic constant of the twist of the liquid crystal; $\in^o$, the vacuum dielectric constant; and $\Delta\in$, the dielectric anisotropy of the liquid crystal.

Thus, the greater the thickness d of the liquid crystal layer, the lower the threshold voltage $V_{th}$. This can be interpreted as explained below. In an IPS display mode, switching is performed according to the balance between electric field energy resulting from the application of an electric field and the elastic energy of the oscillated liquid crystal to return to its initial alignment. When the thickness d of the liquid crystal layer increases, the distance between the alignment layers fixing the liquid crystal against rotation increases and the elastic energy decreases. As a result, the oscillation of the liquid crystal can be induced with less electric field energy, and the threshold voltage $V_{th}$ drops accordingly.

Figure 6B:
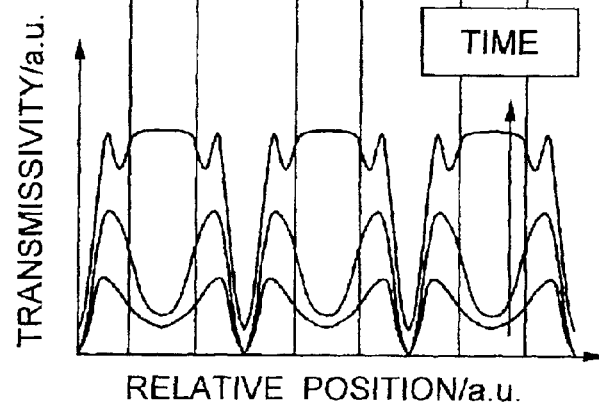

Therefore, when the liquid crystal layer varies in thickness, switching takes place in the following process. In a concave portion, where the liquid crystal layer is thicker, the elastic energy is lower, and in a convex portion, where the liquid crystal layer is thinner, the elastic energy is greater. As a result, when an electric field is applied, switching begins in the concave portion where the liquid crystal layer is thicker and after that switching takes place in the convex portion where the liquid crystal layer is thinner, as illustrated in FIG. 6B showing the variation in the transmissivity of light passing the liquid crystal over time. When the voltage is low, switching takes place only in the concave portion where the liquid crystal layer is thicker.

Figure 7:
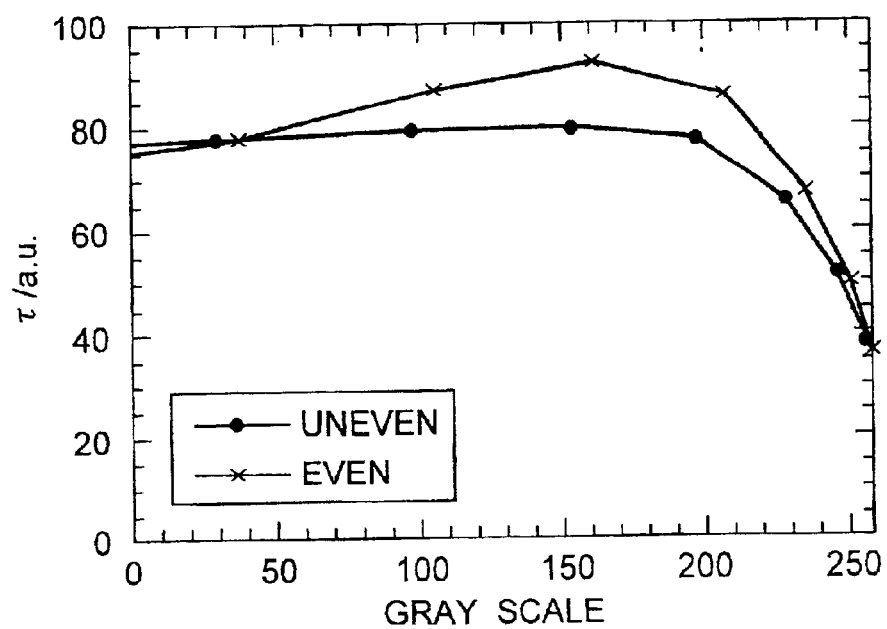
FIG. 7 illustrates a response quickening effect of the unevenness of the liquid crystal layer.

As described above, since fast switching in and around the concave portion where the liquid crystal layer is thicker is predominant in switching from a black gray scale to a half gray scale, the response time of the liquid crystal is shortened. FIG. 7 illustrates how the formation of unevenness reduces the response time of the liquid crystal. The horizontal axis represents the gray scale after switching, and the longitudinal axis, the response time. Here, the gray scale the switching is zero. As shown in FIG. 7, in the conventional liquid crystal display apparatus having no unevenness, switching from the zero gray scale to the half gray scale is slow. By contrast, in the liquid crystal display apparatus whose surface is made uneven, switching from the zero gray scale to the half gray scale is quickened.

Furthermore, the invention makes it possible to restrain gray scale color variations with the rise or fall of the drive voltage. The following principle explains this effect.

The transmissivity (T) in an IPS display mode can be generally expressed in the following Equation (2):

$$T = T_o \cdot \sin^2(2\chi) \cdot \sin^2(\pi \cdot d \cdot \Delta n_{\mathit{eff}}/\lambda) \qquad (2)$$

where $T^o$ is the correction coefficient; $\chi$, the angle formed by the effective optical axis of the liquid crystal and the deflecting direction of the incident light; $\Delta n^{\mathit{eff}}$, the effective refractive index anisotropy of the liquid crystal; and $\lambda$, the wavelength of the incident light.

Therefore, when the angled formed by the effective aligned direction of the liquid crystal and the deflecting direction of the incident light is $\pi/4$ radians (45 degrees), a light whose wavelength $\lambda$ is two times the effective retardation deff·$\Delta$neff manifests the highest transmissivity. Thus, the effective retardation deff·$\Delta$neff varies, the wavelength that maximizes the transmissivity varies, resulting in a color gray scale variation.

Here, according to the invention, when an electric field is applied, switching begins in the region where the liquid crystal layer has a greater thickness (deff), i.e. the region where the effective retardation deff·$\Delta$neff is greater. Thus, even when the drive voltage is low, deff·Δneff takes on a higher value, the wavelength that maximizes the transmissivity is long, and yellow is emphasized. As a result, the problem that the color gray scale varies from blue to yellow along with a rise in drive voltage, which is experienced with the conventional liquid crystal display apparatus having no variation in the thickness of the liquid crystal layer illustrated in FIG. 2 through FIG. 4, can be alleviated.

The present invention is based on the principle that switching begins in the region, if any, where the elastic energy is partially low. Therefore, to enable the invention to be applied, the only requirement is that the thickness of the liquid crystal layer varies in a light-transmissive region with no limitation whatsoever to the shape of unevenness. The concave and convex portions may either be sharp or rounded. Nor is there any limitation to the ratio between the concave and convex portions in square measure. However, if this ratio in square measure is varied, there will be changes in the level of quickening effect, the gray scale subject to quickening and the effect to restrain color gray scale variations with a rise or fall of the drive voltage. To enhance these effects, it is preferable to secure a certain thickness of the liquid crystal layer.

Next will be described embodiments of the present invention in more specific terms with reference to accompanying drawings.

(Embodiment 1)

The configuration of Embodiment 1 of the invention will be described below with reference to FIG. 1, FIG. 2 and FIG. 5. This embodiment matches claims 1 through 5 and 18. Where it is stated that any embodiment "matches" any claim, it is meant that the embodiment is a typical example but not that it matches no other claim. For instance, Embodiment 1 matches claim 8 as well.

Figure 2:
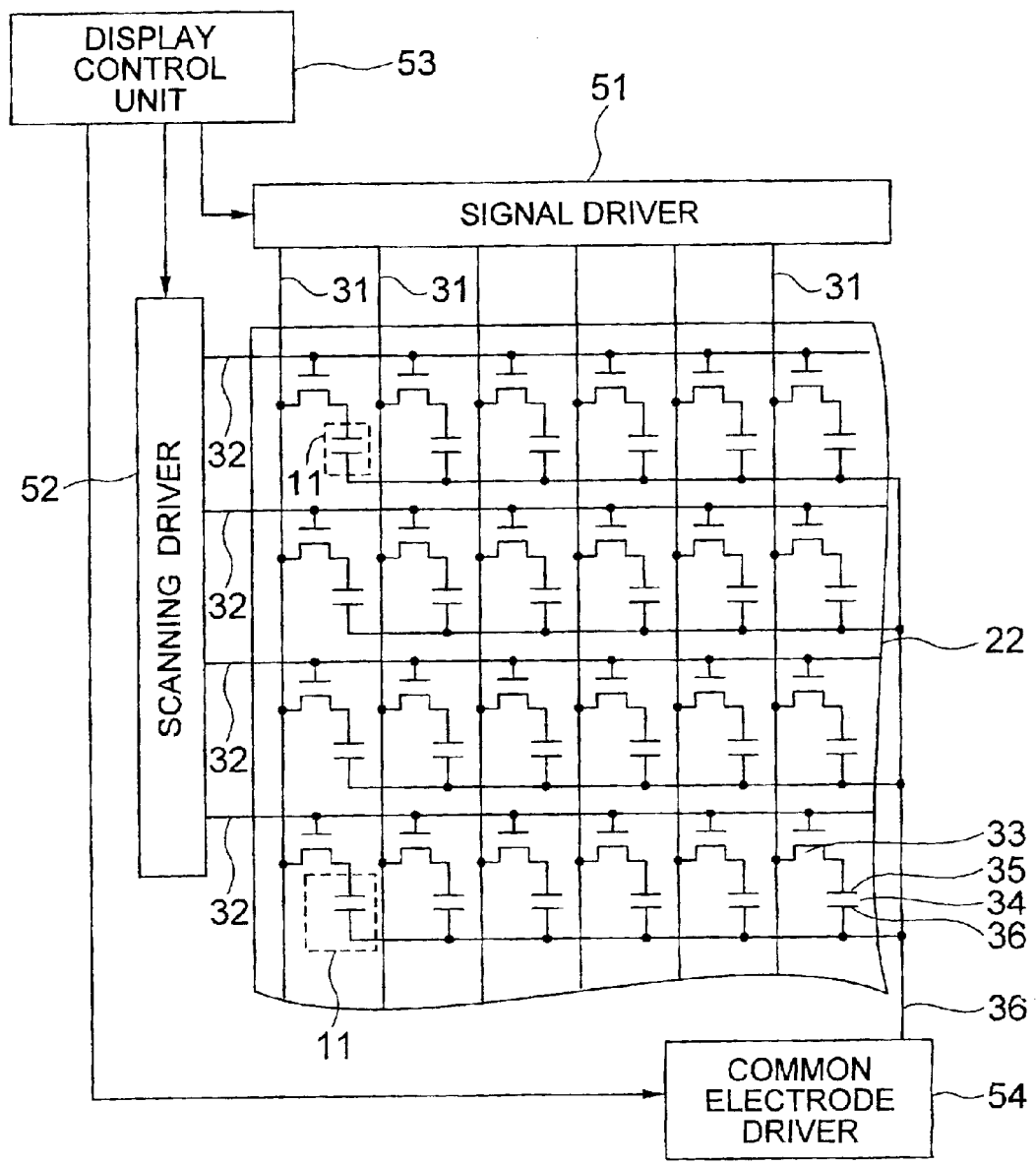
FIG. 2 illustrates a circuit configuration of the liquid crystal display apparatus both according to the prior art and the invention.

The liquid crystal display apparatus, which is this Embodiment 1, as shown in FIG. 2, has a signal driver 51 for supplying a signal voltage to each pixel electrode 35, a scanning driver 52 for supplying a voltage for pixel selection, a common electrode driver 54 for supplying a voltage to each common electrode 36, a display control unit 53 for controlling the signal driver 51, the scanning driver 52 and the common electrode driver 54.

A substrate 1 is provided with a plurality of scanning lines 32 connected to the scanning driver 52, signal lines 31 connected to the signal driver 51 and crossing the scanning lines 32, first TFTs 33 arranged matchingly near the intersections between the scanning lines 32 and the signal lines 31 and electrically connected to the scanning lines 32 and the signal lines 31, the pixel electrodes 35 electrically connected to the first TFTs 33 and matching the signal lines 31, the common electrodes 36 matching the pixel electrodes 35, and electrode connecting portions 36' electrically connected to the common electrodes 36 and the common electrode driver 54.

Each of the pixels 11 is formed in an area surrounded by signal lines 31 and scanning lines 32, and this plurality of pixels 11 constitute a display section 22.

Figure 1:
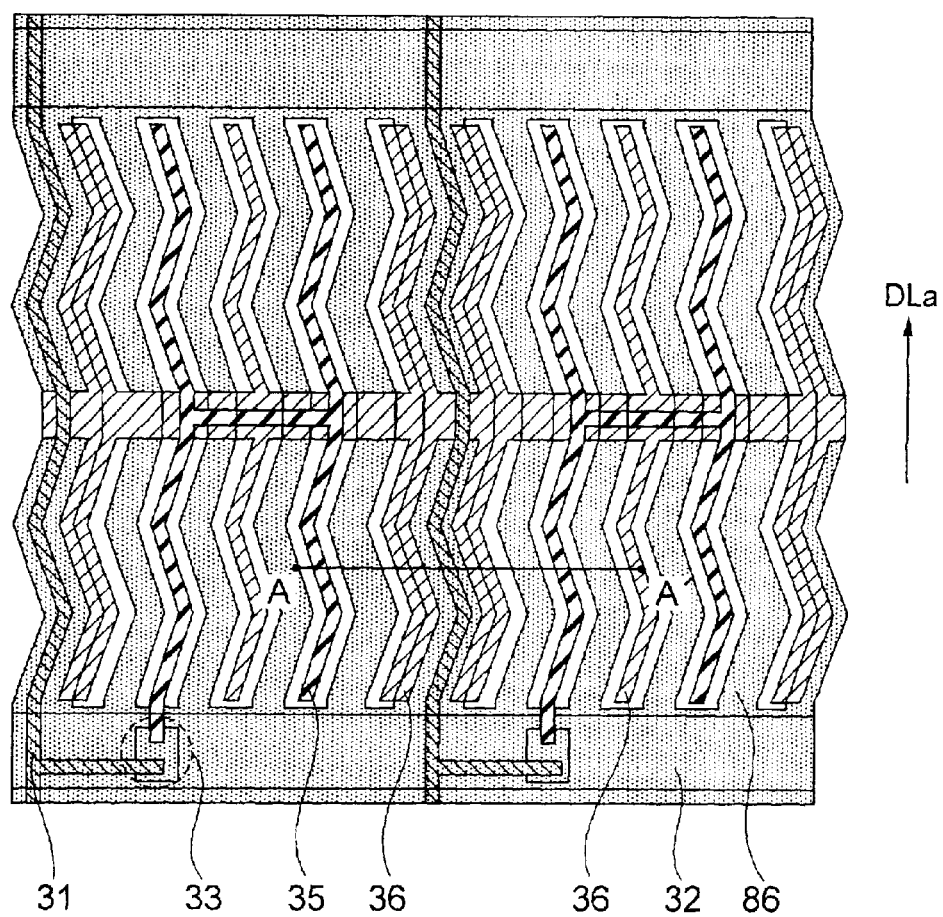
FIG. 1 illustrates a configuration of a circuit arrangement pattern in a pixel and its vicinity in a liquid crystal display apparatus, which is a first embodiment of the present invention.

FIG. 1 illustrates the configuration of the circuit arrangement pattern in a pixel and its vicinity in Embodiment 1. The scanning lines 32 and the signal lines 31 cross each other, and a pixel 11 is formed matching an area surrounded by scanning lines 32 and signal lines 31. Each of the first TFTs 33 is arranged in a matching way near the intersection between a scanning line 32 and a signal line 31, and electrically connected to the scanning line 32, the signal line 31 and the pixel electrode 35. Each of the common electrodes 36 is arranged matching a pixel electrode 35, and the common electrode 36 and the pixel electrode 35 generate an electric field whose components are parallel to the substrate surface. The pixel electrode 35, the common electrode 36 and the signal line 31 are bent once or more within each pixel to constitute a multi-domain. A second insulating film 86 is arranged in a light-transmissive region between the pixel electrode 35 and the common electrode 36, and serves to vary the thickness of the liquid crystal layer 34.

Figure 5:
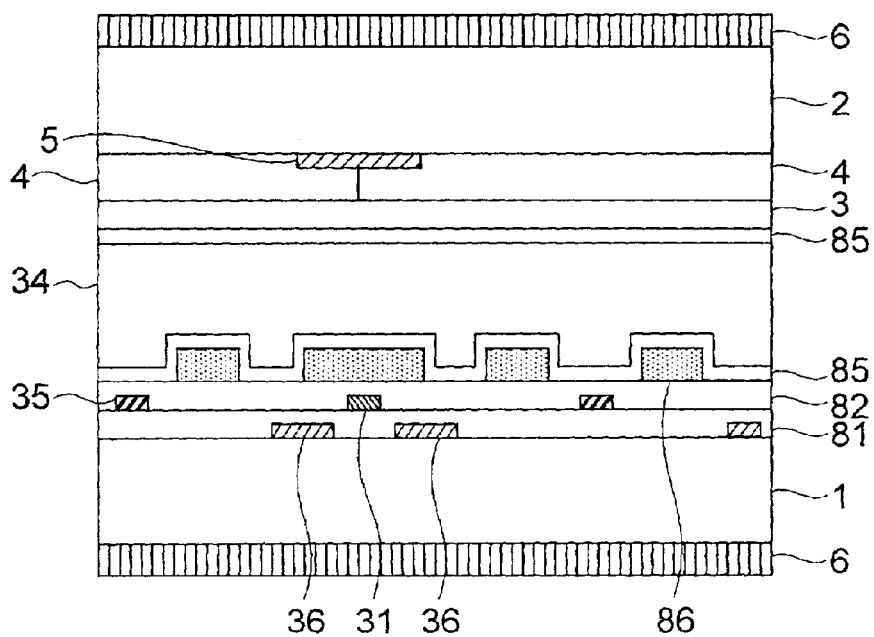
FIG. 5 illustrates a configuration of a pixel and its vicinity in a section of the liquid crystal display apparatus, which is the first embodiment of the invention.

FIG. 5 shows an A–A' section in FIG. 1. This configuration has the substrate 1 made of transparent glass, another substrate 2 arranged opposite the substrate 1 and also made of transparent glass, and the liquid crystal layer 34 held between the substrates 1 and 2.

The substrate 1 has the common electrodes 36, the scanning lines 32 (not shown), the signal line 31 arranged in a higher layer than the common electrodes 36 with a first insulating film 81 in-between, the pixel electrodes 35 matching the common electrodes 36 generating an electric field whose components are parallel to the surface of the substrate 1, the protective film 82 provided over the pixel electrodes 35, the second insulating film 86 provided over the protective film 82 and having an uneven surface to vary the thickness of the liquid crystal layer 34, an alignment film 85 provided over the second protective film 86, and a polarizer 6 provided on the other side than the liquid crystal side of the substrate 1 and varying its optical characteristics according to the alignment of the liquid crystal.

The common electrodes 36, the pixel electrodes 35 and the signal line 31 are made of conductors of about 0.2 $\mu$m in thickness, which may be CrMo, Al, indium tin oxide (ITO) or the like. The first insulating film 81 and the protective film 82 are made of insulators of respectively about 0.3 $\mu$m and 0.8 $\mu$m in thickness, which may be silicon nitride or the like. The second insulating film 86 is made of an insulator of about 1 $\mu$m in thickness, which is formed to dispose level gap attributable to the formation of concave and convex portion which may be either an inorganic or organic substance. To add, obviously the invention is not limited to the film thicknesses and materials stated above.

The substrate 2 has the light shielding film 5 for shielding against unnecessary lights from gaps; the color filter 4, provided over the light shielding film 5, for expressing colors respectively corresponding to R, G and B; the flattening film 3 for flattening unevenness; the alignment film 85 provided over the flattening film 3, and the polarizer 6 provided over the other side than the liquid crystal side of the substrate 2.

The alignment film 85 is rubbed to align the liquid crystal. The rubbing direction is parallel to the extending direction DLa of the signal line. The angle formed between one side of the bent pixel electrode and the rubbing direction is 15 degrees, matching the IPS display mode.

The axis of transmission of the polarizer 6 is parallel or vertical in the rubbing direction of the alignment film 85 on the substrate over which that particular polarizer 8 is arranged, and the polarizer of the substrate 1 and the polarizer of the substrate 2 are in a cross Nicol arrangement, matching the normally black mode. Incidentally, it is needless to say that the present invention is not limited to the above-stated rubbing angle, and further is applicable to the normally white mode as well.

Between the substrate 1 and the substrate 2, there are dispersed beads to secure an adequate thickness for the liquid crystal layer 34. Since the beads are also present on the convex portions, the beads on the convex portions determine the thickness of the liquid crystal layer. Therefore, in order to uniformize the average thickness of the liquid crystal layer for every pixel, it is desirable to increase the area of the convex portions. For this reason, the second insulating film 86 to make the surface uneven is arranged outside the display area within pixels, such as over the signal lines 31 and the scanning lines 32. To add, it is obvious that columnar spacers can as well be applied in place of the second insulating film.

The diameter of the beads is about 3 μm, and accordingly the thickness of the liquid crystal layer 34 is about 4 μm and the refractive index anisotropy of the liquid crystal layer 34, about 0.1, the retardation (Δnd) being adjusted with this combination. To add, obviously, the applicability of the invention is not limited to this retardation.

There is no limitation regarding the back light (not shown) either. For instance, a straight down type or a side light type can be used.

Driving is accomplished in an active matrix system.

According to the invention, as the thickness of the liquid crystal layer varies, the elastic energy is less in concave portions where the liquid crystal layer is thicker, and switching begins in the concave region when an electric field is applied between the pixel electrode 35 and the common electrode 36. Therefore, switching from the zero gray scale to the half gray scale can be quickened, making it possible to provide a liquid crystal display apparatus excelling in the quality of moving pictures displayed.

Incidentally, the invention can obviously be applied to the use of the protective film 82 for the formation of unevenness instead of the second insulating film 86.

Also, the invention can obviously be applied to the variation of the thickness of the liquid crystal layer 34 in the light-transmissive region by forming an uneven second insulating film throughout the display section 22 instead of making the surface uneven by providing the second insulating film 86 somewhere and not providing it elsewhere.

COMPARATIVE EXAMPLE 1

Comparative Example 1 of the invention differs from Embodiment 1 only in that the second insulating film 86 is not formed, and the thickness of the liquid crystal layer 34 is substantially constant in the light-transmissive region.

Figure 3:
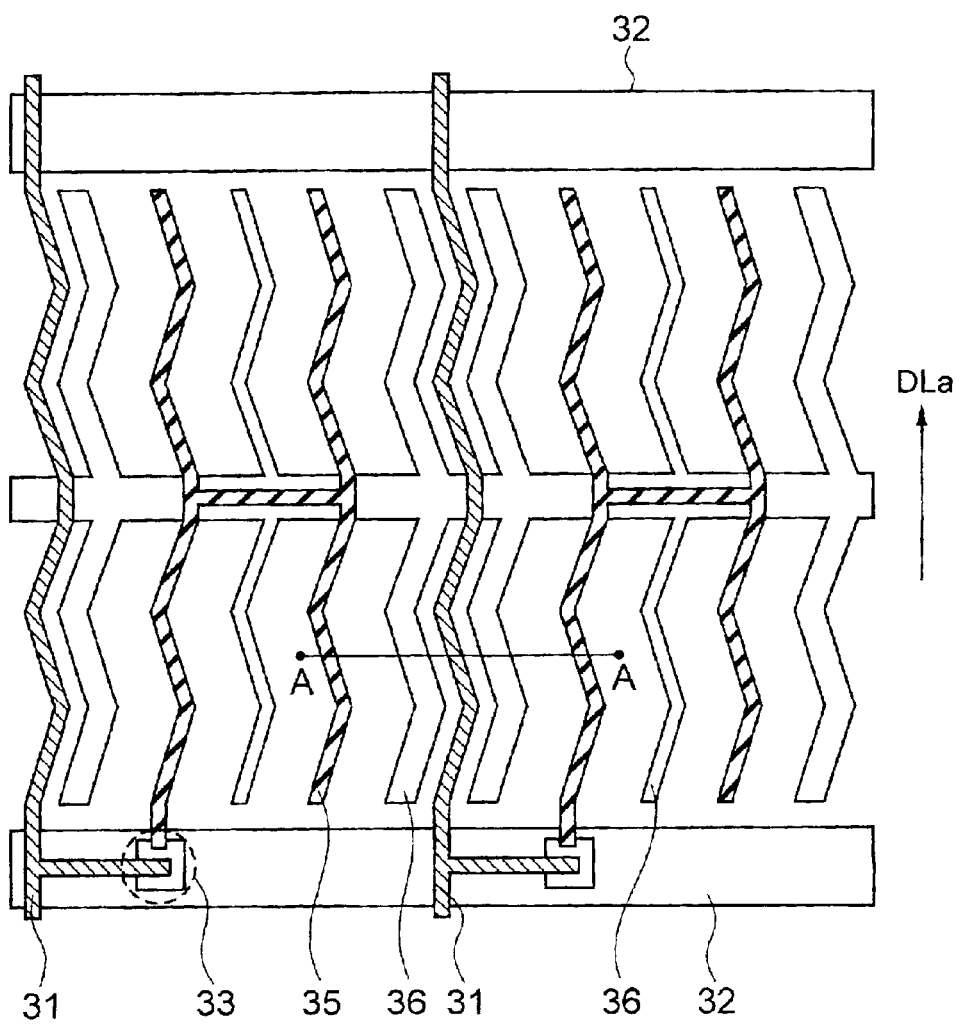
FIG. 3 illustrates a configuration of a circuit arrangement pattern in a pixel and its vicinity in the conventional liquid crystal display apparatus.

FIG. 3 illustrates the configuration of a circuit arrangement pattern in a pixel and its vicinity in Comparative Example 1. Unlike in Embodiment 1, no second insulating film is formed.

FIG. 4 shows an A–A' section in FIG. 3. Unlike in Embodiment 1, there is no second insulating film, and the thickness of the liquid crystal layer is constant.

For this reason, the response of the liquid crystal to switching from the zero gray scale to the half gray scale is slower than in Embodiment 1.
(Embodiment 2)

Embodiment 2 differs from Embodiment 1 only in the shape of the second insulating film 86. Therefore, it will be described with reference to FIGS. 8 and 9. This embodiment matches claims 1 and 5.

Figure 8:
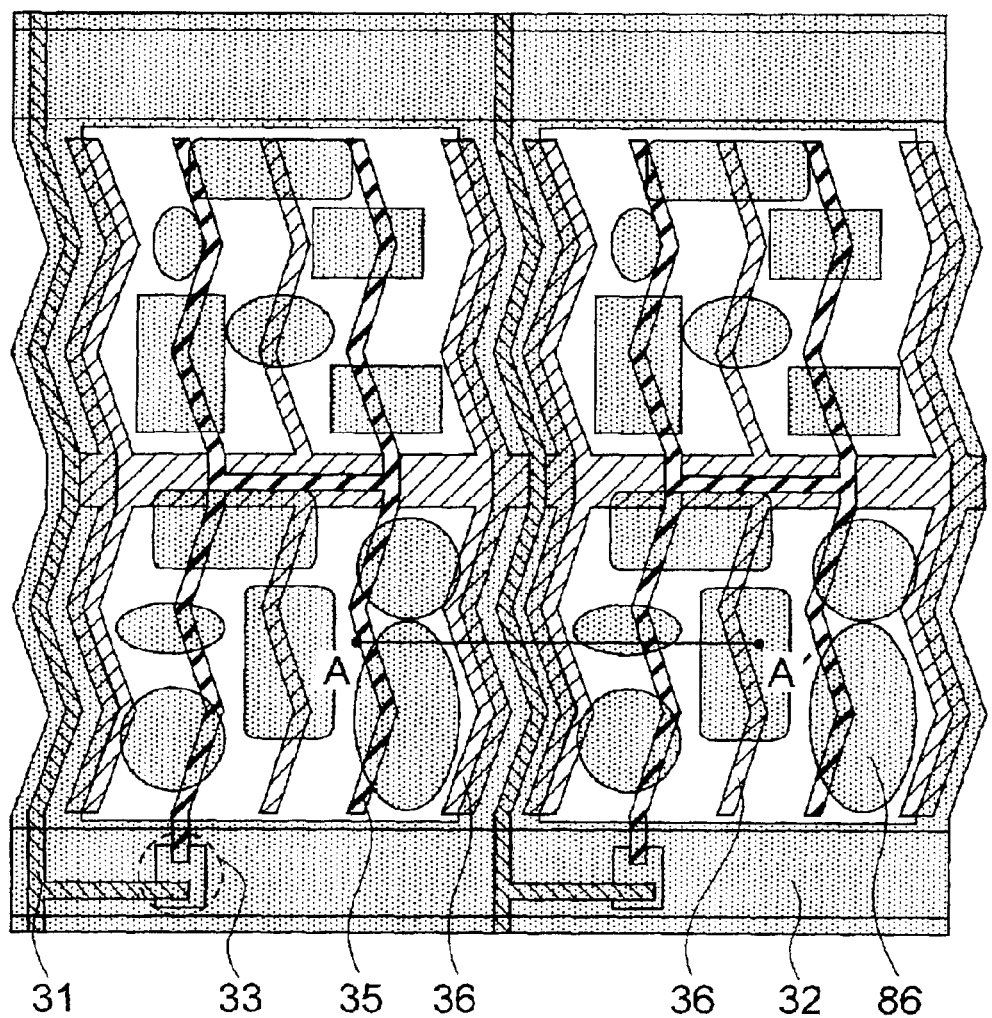
FIG. 8 illustrates a configuration of a circuit arrangement pattern in a pixel and its vicinity in a liquid crystal display apparatus, which is a second embodiment of the invention.

FIG. 8 illustrates the configuration of the circuit arrangement pattern of the pixel and its vicinity in Embodiment 2. Unlike in Embodiment 1, the shape and arrangement of the second insulating film 86 are random.

Figure 9:
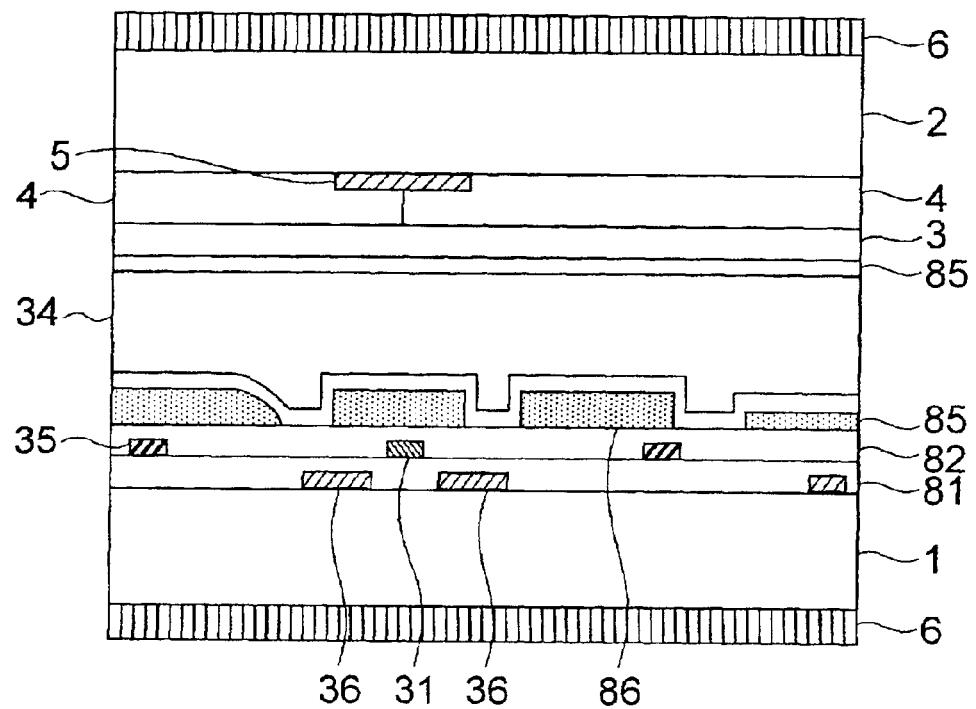
FIG. 9 illustrates a configuration of a pixel and its vicinity in a section of the liquid crystal display apparatus, which is the second embodiment of the invention.

FIG. 9 shows an A–A' section in FIG. 8. Unlike in Embodiment 1, the shape, arrangement and the depths of heights of the concave and convex portions of the second insulating film are random.

However it is preferable that the ratio in square measure between concave and convex portions in any single pixel and the average depths of heights of the concave and convex portions among different pixels be equal. If they are unequal, the quickening effect will vary from pixel to pixel, inviting such faults as uneven brightness.

As the thickness of the liquid crystal layer varies in this embodiment as in Embodiment 1, the elastic energy is less in the concave portions where the liquid crystal layer is thicker, and switching begins when an electric field is applied between the pixel electrode 35 and the common electrode 36. For this reason, it is made possible to quicken switching from the zero gray scale to the half gray scale and provide a liquid crystal display apparatus excelling in the quality of moving pictures displayed.
(Embodiment 3)

Embodiment 3 differs from Embodiment 1 in the shape and arrangement of the second insulating film. These differences will be described with reference to FIG. 10 and FIG. 11. This embodiment matches claims 6 and 7.

Figure 10:
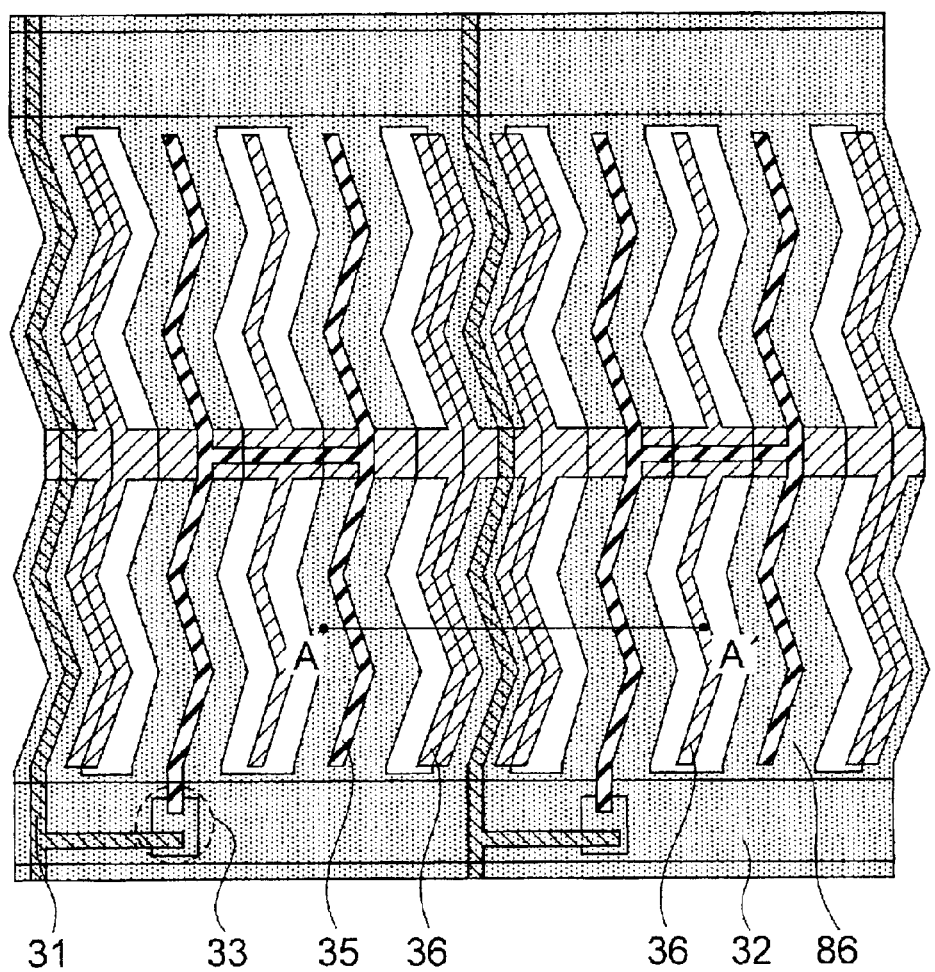
FIG. 10 illustrates a configuration of a circuit arrangement pattern in a pixel and its vicinity in a liquid crystal display apparatus, which is a third embodiment of the invention.
Figure 11:
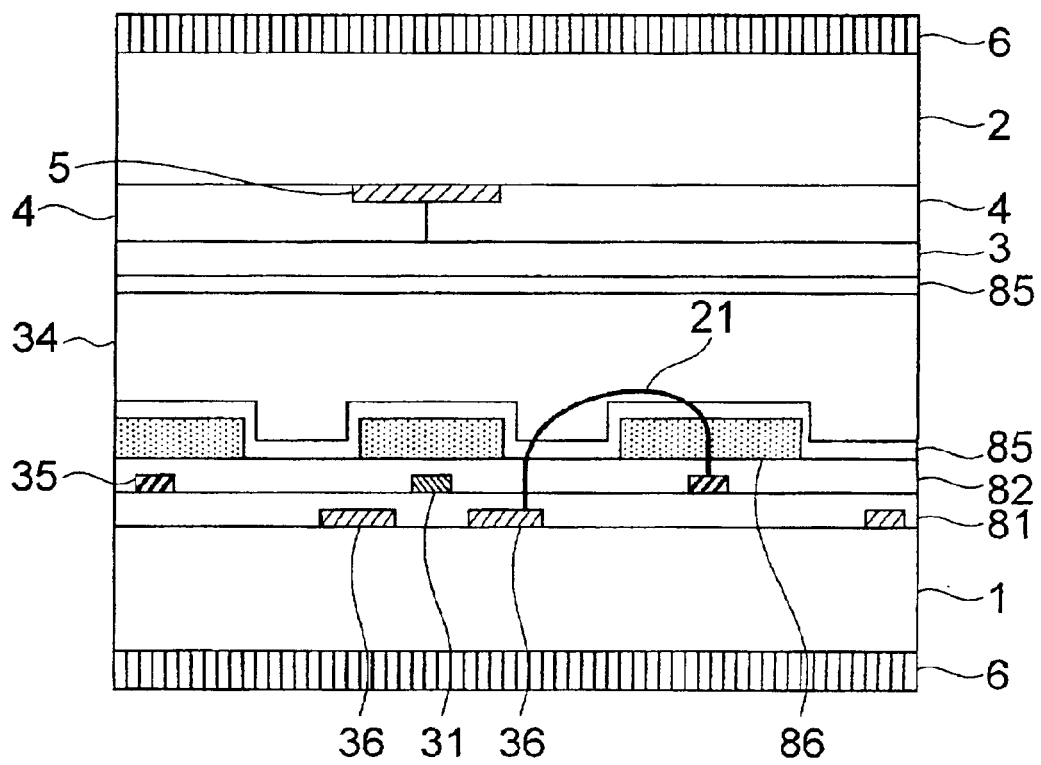
FIG. 11 illustrates a configuration of a pixel and its vicinity in a section of the liquid crystal display apparatus, which is the third embodiment of the invention.

FIG. 10 illustrates the configuration of the circuit arrangement pattern in a pixel and its vicinity in Embodiment 3. FIG. 11 shows an A–A' section in FIG. 10.

In this embodiment, unlike in Embodiment 1, between the pixel electrode 35 and the common electrode 36, there is only one level gap attributable to the formation of concave and convex portions by the second insulating film 86. The pixel electrodes 35 are superposed over convex portions, and the common electrodes 36 are superposed over concave portions.

This results in a greater width of the concave-convex pattern than in Embodiment 1, enabling the second insulating film 86 to be more easily machined.
(Embodiment 4)

Embodiment 4 differs from Embodiment 3 in the arrangement of the electrodes and the second insulating film. This difference will be described below with reference to FIG. 12 and FIG. 13. This embodiment matches claim 9.

Figure 12:
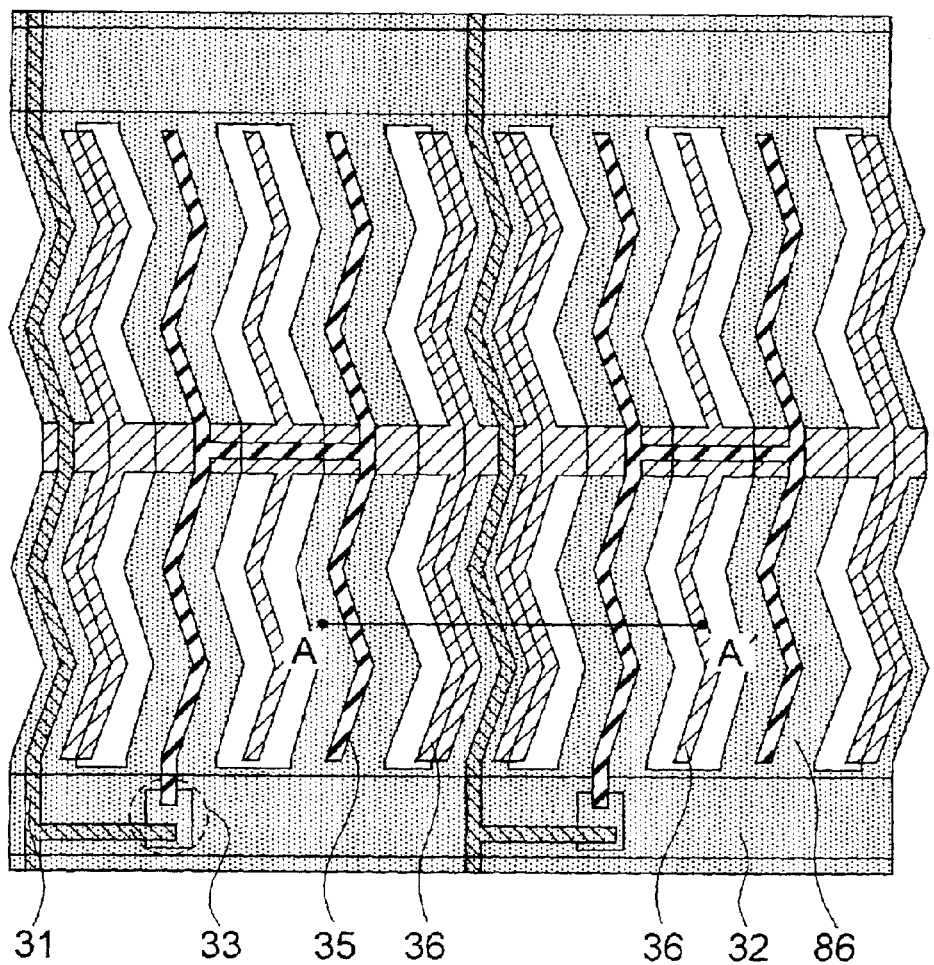
FIG. 12 illustrates a configuration of a circuit arrangement pattern in a pixel and its vicinity in a liquid crystal display apparatus, which is a fourth embodiment of the invention.
Figure 13:
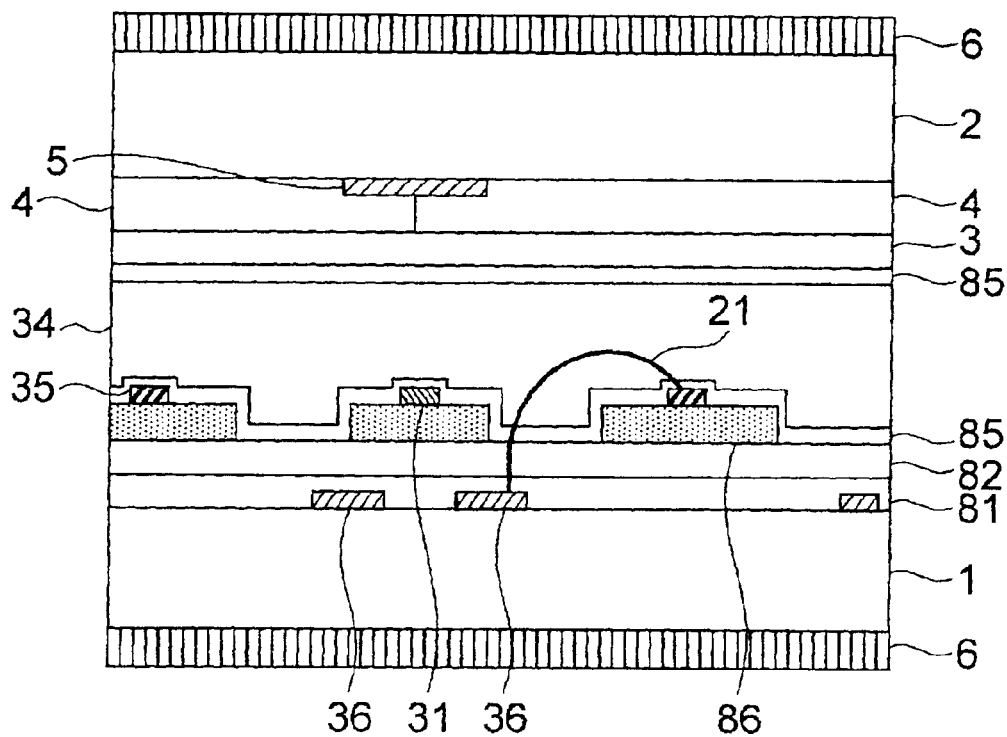
FIG. 13 illustrates a configuration of a pixel and its vicinity in a section of the liquid crystal display, which is the fourth embodiment of the invention.

FIG. 12 illustrates the configuration of the circuit arrangement pattern in a pixel and its vicinity in Embodiment 4. FIG. 13 shows an A–A' section in FIG. 12.

In Embodiment 4, unlike in Embodiment 3, the pixel electrodes 35 and the signal lines 31 are arranged in a higher layer than the second insulating film 86. The common electrodes 36, together with the scanning lines 32 (not shown in FIG. 13) are arranged over the substrate 1. Here in this Embodiment 3, as is evident from FIG. 11, out of electric lines of force 21 of the electric field generating between the pixel electrode 35 and the common electrode 36, most of the electric lines of force 21 passing the liquid crystal layer also pass the second insulating film 86. In other words, the electric field is applied to the liquid crystal layer 34 via the second insulating film 86. On the other had, in Embodiment 4, as is seen from FIG. 13, as the pixel electrodes 35 are arranged in a higher layer than the second insulating film 86, the electric field is applied to the liquid crystal layer 34 without going through the second insulating film 86. As a result the drive voltage can be lower in Embodiment 4 than in Embodiment 3.

Incidentally, where no protective film 82 is formed, where the protective film 82 and the second insulating film 86 are machined together, or the protective film 82 and the second insulating film 86 are integrally built of the same material, the invention can also be applied because the thickness of the liquid crystal layer 34 can be varied.
(Embodiment 5)

Embodiment 5 differs from Embodiment 4 in the arrangement of the second insulating film. This difference will be described below with reference to FIG. 14, FIG. 15 and FIG. 16. This embodiment matches claim 10.

Figure 14:
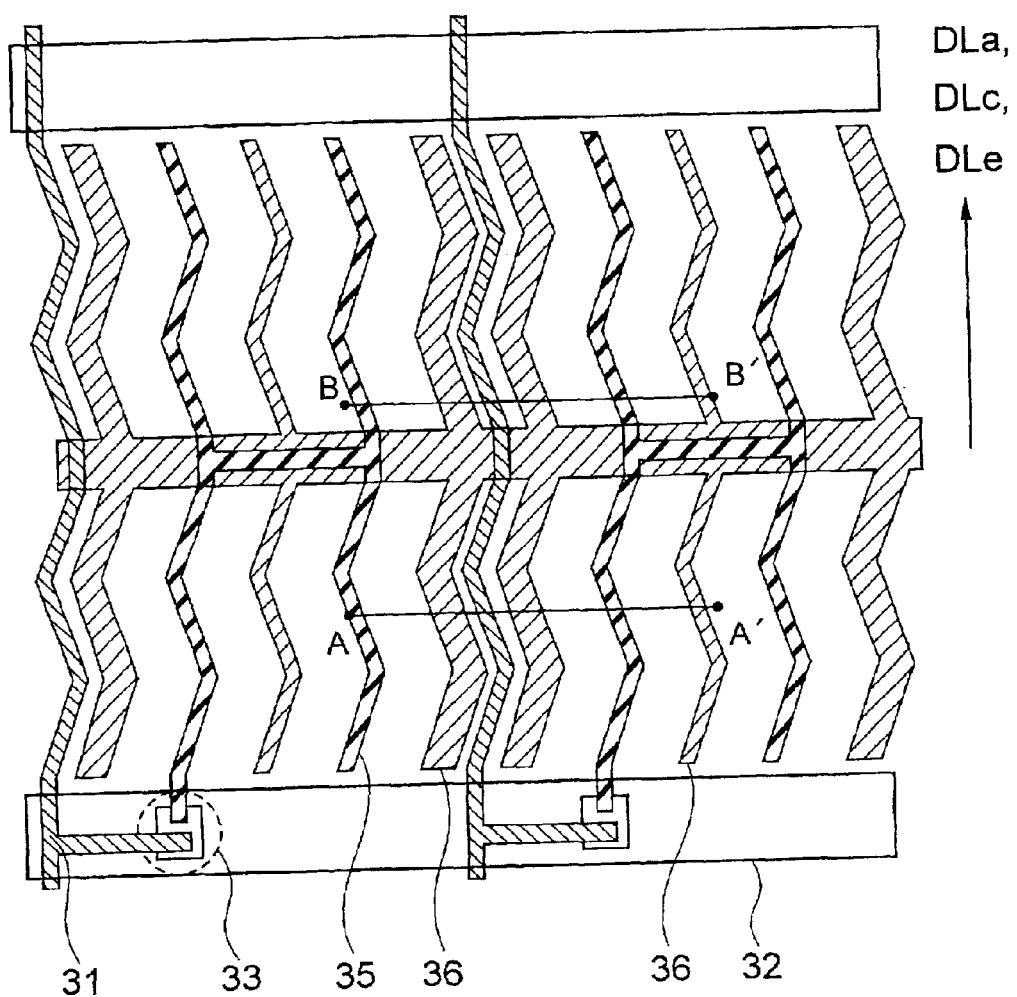
FIG. 14 illustrates a configuration of a circuit arrangement pattern in a pixel and its vicinity in a liquid crystal display apparatus, which may be any of fifth through seventh embodiments of the invention.
Figure 15:
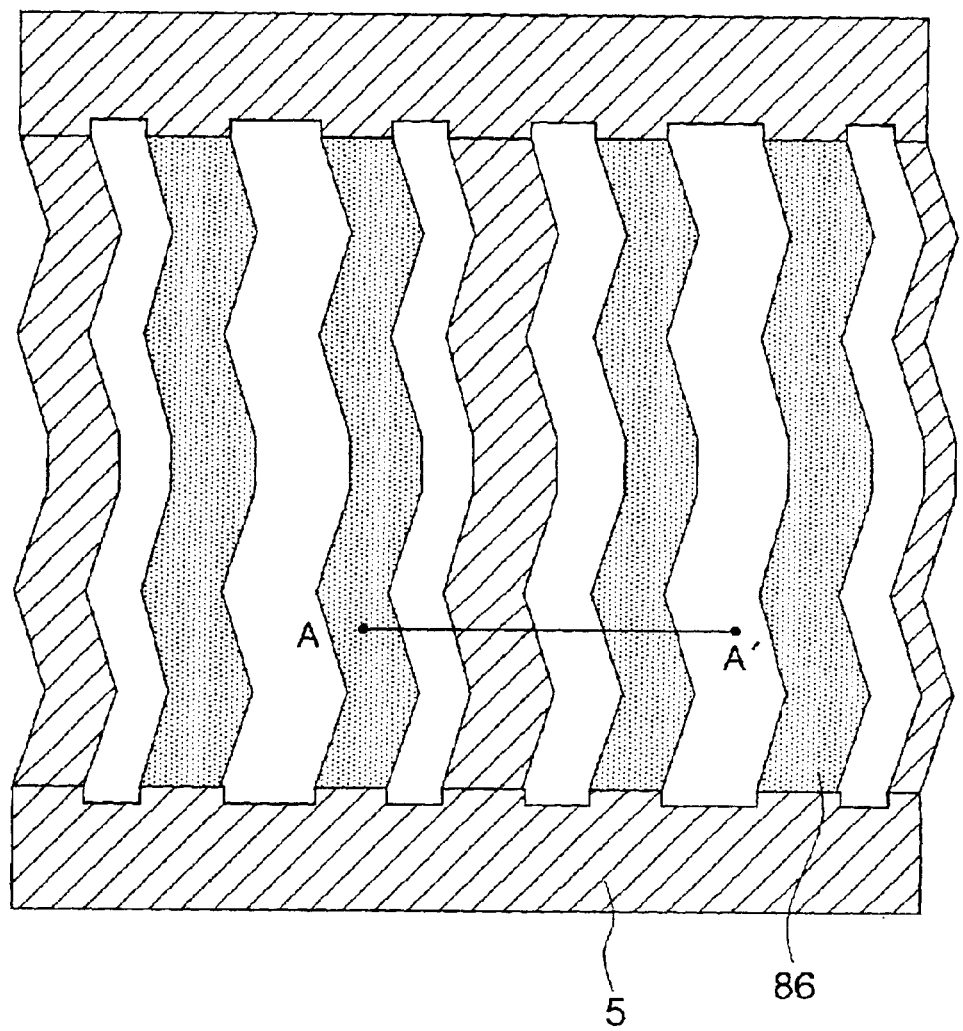
FIG. 15 illustrates a configuration of a circuit arrangement pattern in a pixel and its vicinity in a liquid crystal display apparatus, which is a fifth embodiment of the invention.
Figure 16:
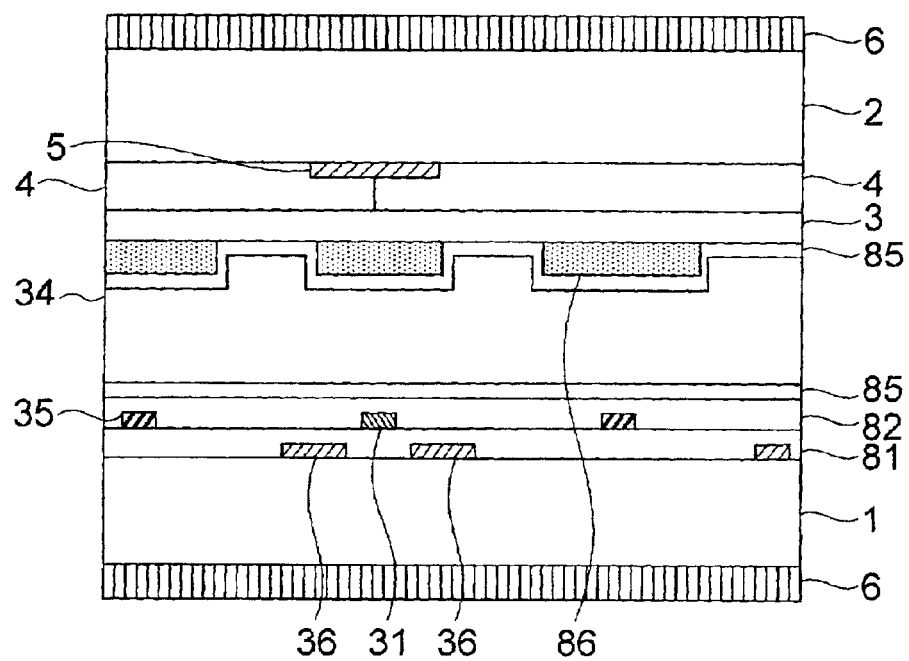
FIG. 16 illustrates a configuration of a pixel and its vicinity in a section of the liquid crystal display apparatus, which is the fifth embodiment of the invention.

FIG. 14 illustrates the configuration of the circuit arrangement pattern in a pixel and its vicinity over the substrate 1 in Embodiment 5. FIG. 15 shows the configuration of the circuit arrangement pattern in a pixel and its vicinity over the substrate 2 of this embodiment. FIG. 16 shows an A–A' section in FIG. 14.

The substrate 1 has the common electrodes 36, the scanning line 32 (not shown in FIG. 16), the signal line 31 arranged in a higher layer than the common electrode 36 with the first insulating film 81 in-between, the pixel electrodes 35 generating an electric field whose components are parallel to the surface of the substrate 1, the protective film 82 provided over the pixel electrodes 35, the alignment film 85 provided over the protective film 82, and the polarizer 6 provided on the other side than the liquid crystal side of the substrate 1 and varying its optical characteristics according to the alignment of the liquid crystal.

The substrate 2 has the light shielding film 5 for shielding against unnecessary lights from gaps; the color filter 4, provided over the light shielding film 5, for expressing colors respectively corresponding to R, G and B; the flattening film 3, provided over the color filter 4, for flattening the unevenness of the filter; the second insulating film 86, provided over the flattening film 3, for forming the unevenness to vary the thickness of the liquid crystal layer 34; the alignment film 85 provided over the second insulating film 86; and the polarizer 6 provided over the other side than the liquid crystal side of the substrate 2.

In Embodiment 5, unlike in Embodiment 4, the second insulating film 86 for forming the unevenness to vary the thickness of the liquid crystal layer 34 is arranged over the substrate 2. As a result, electrodes and wiring lines including the pixel electrodes 35, the common electrode 36, the signal lines 31 and the scanning lines 32 are distant from the second insulating film 86, and therefore even if the thickness of the second insulating film 86 varies, the floating capacity between the pixel electrodes 35 and the common electrodes 36 or elsewhere does not fluctuate, making it difficult for irregularity of displaying and other faults to be induced.
(Embodiment 6)

Embodiment 6 differs from Embodiment 5 in the arrangement and shape of the second insulating film. These differences will be described with reference to FIG. 14, FIG. 17, FIG. 18 and FIG. 19. This embodiment matches claim 11.

Figure 17:
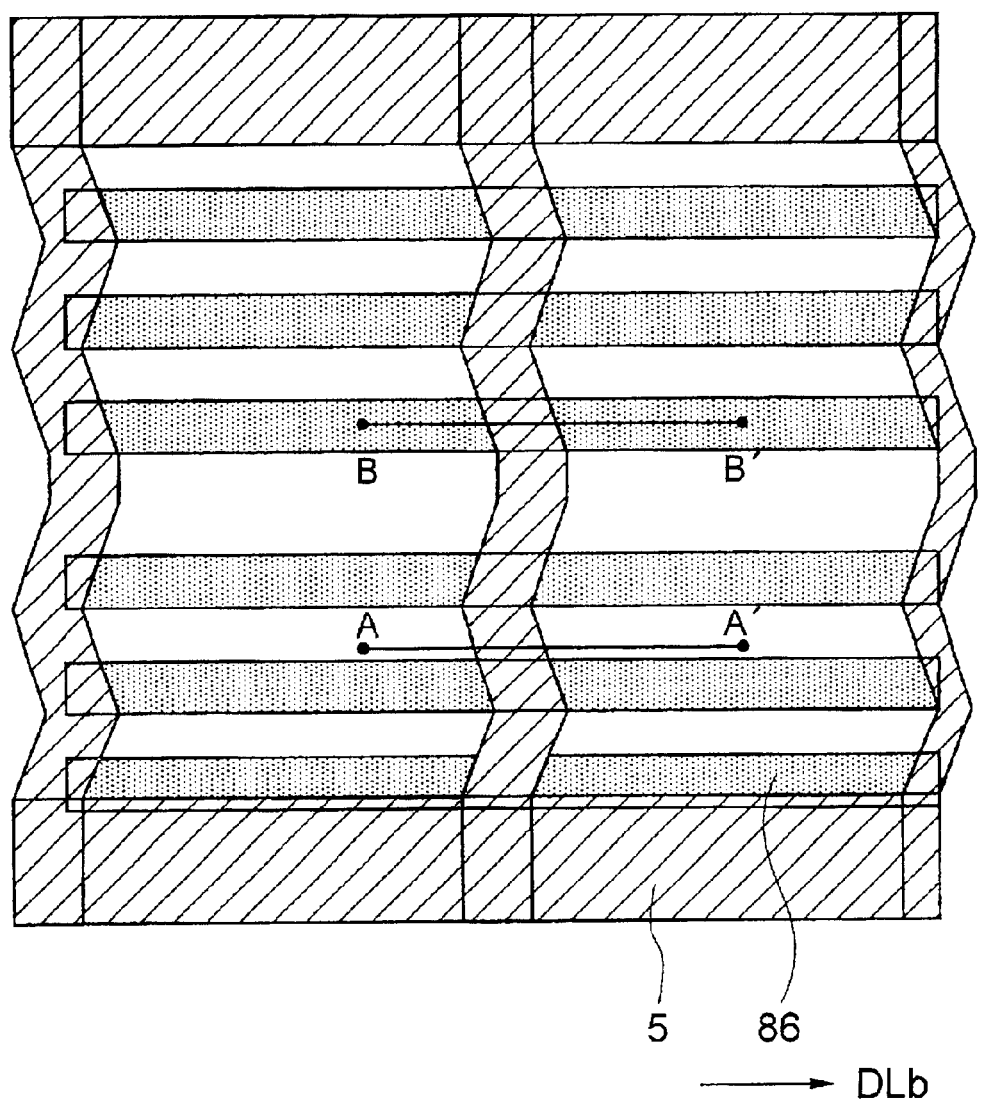
FIG. 17 illustrates a configuration of a circuit arrangement pattern in a pixel and its vicinity in a liquid crystal display apparatus, which is a sixth embodiment of the invention.
Figure 18:
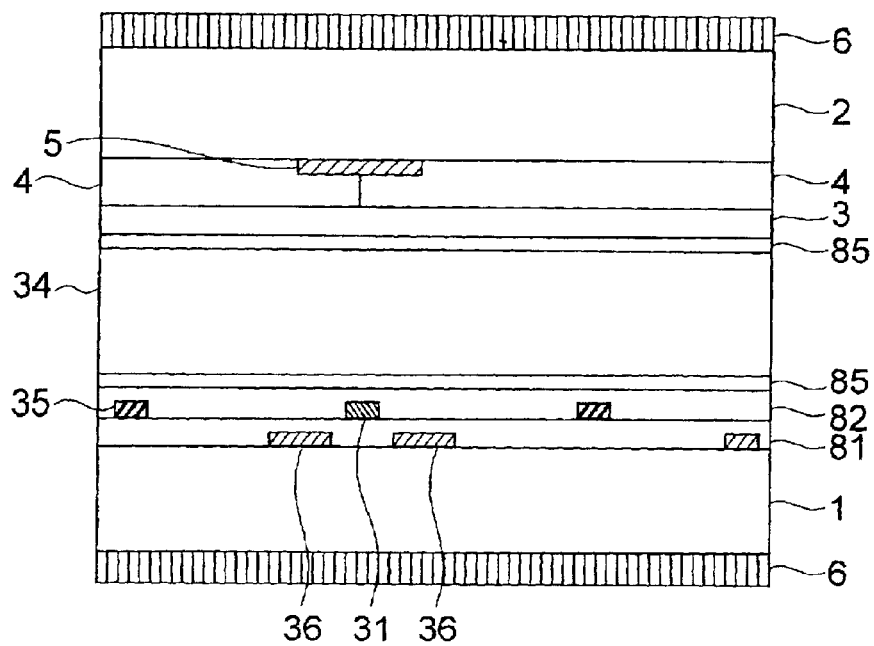
FIG. 18 illustrates a configuration of a pixel and its vicinity in a section (A–A' section in FIG. 17) of the liquid crystal display apparatus, which is the sixth embodiment of the invention.
Figure 19:
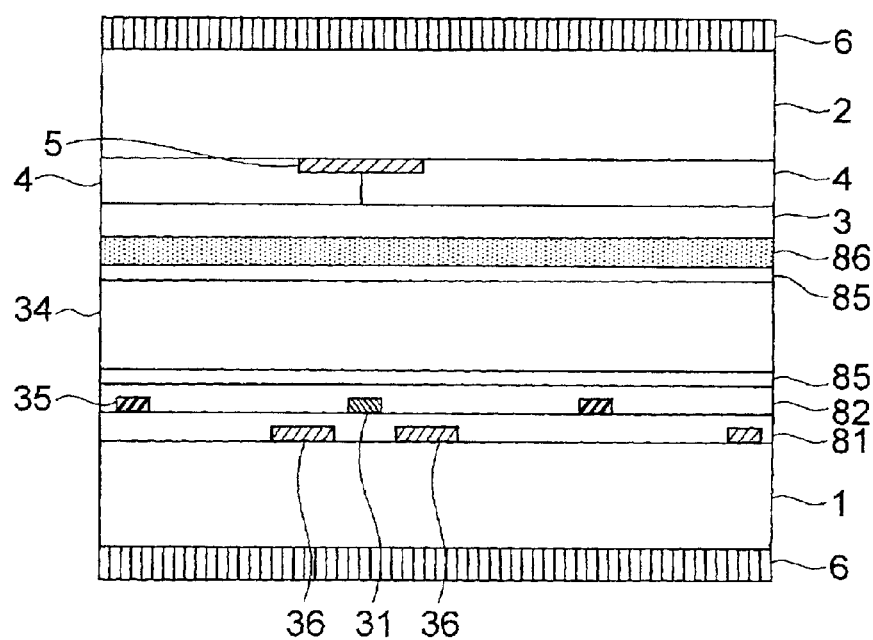
FIG. 19 illustrates a configuration of a pixel and its vicinity in a section (B–B' section in FIG. 17) of the liquid crystal display apparatus, which is the sixth embodiment of the invention.

The configuration of the circuit arrangement pattern in a pixel and its vicinity over the substrate 1 in Embodiment 6 is the same as in FIG. 14. FIG. 17 illustrates the configuration of the circuit arrangement pattern in a pixel and its vicinity over the substrate 2 in this embodiment. FIG. 18 shows an A–A' section in FIG. 17, and FIG. 19 shows a B–B' section in FIG. 14 and FIG. 17.

In Embodiment 6, the extending direction DLb of concave and convex portions formed by the second insulating film 86 deviates from the extending direction DLc of the pixel electrodes, and the two directions cross each other substantially orthogonally. As a result, even if the substrate 1 and the substrate 2 are misaligned with each other, the positional relationship of the second insulating film 86 to the light shielding film 5 will not vary; the ratio in square measure between concave and convex portions remains unchanged from one area between a pixel electrode 35 and a common electrode 36 to another; nor does the effect to shorten the response time of the liquid crystal.
(Embodiment 7)

Embodiment 7 differs from Embodiment 6 in the arrangement and shape of the second insulating film. These differences will be described with reference to FIG. 14, FIG. 20 and FIG. 21. This embodiment matches claim 12.

Figure 20:
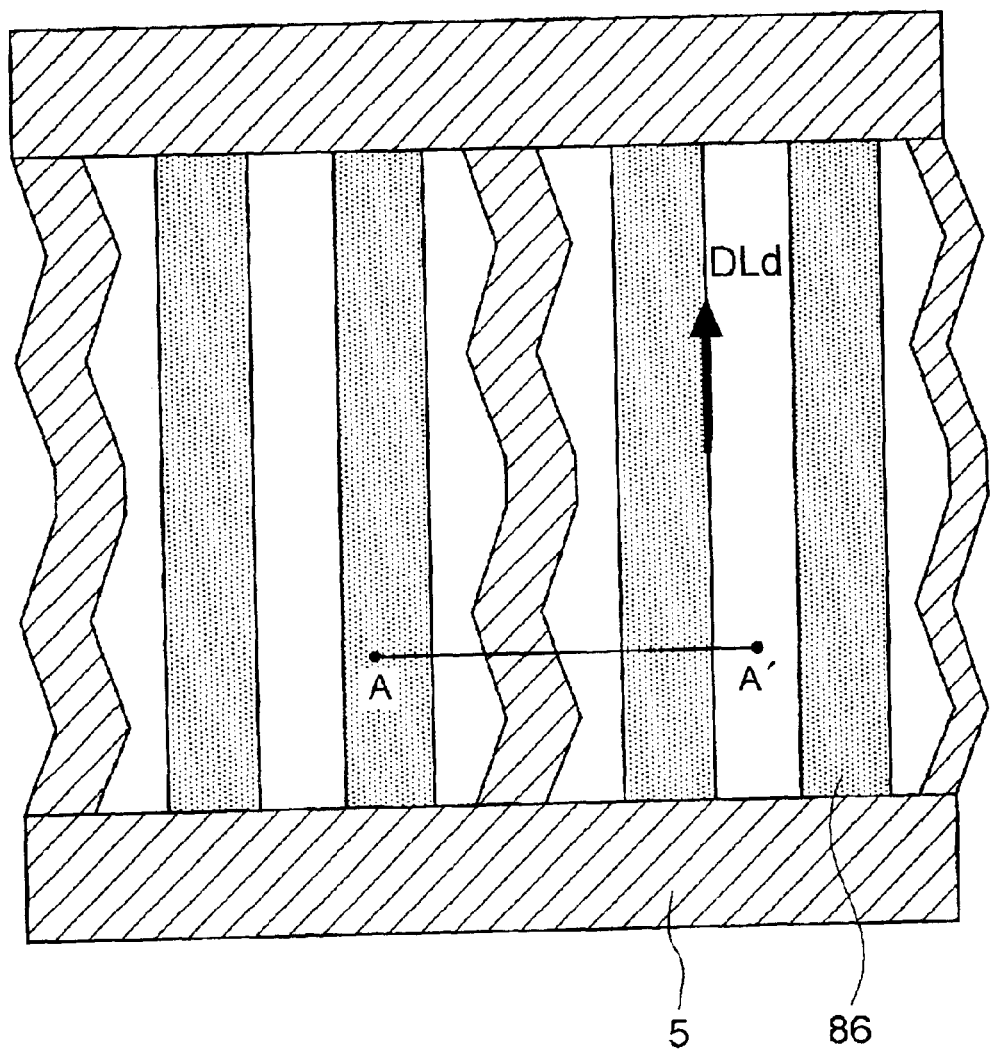
FIG. 20 illustrates a configuration of a circuit arrangement pattern in a pixel and its vicinity in a liquid crystal display apparatus, which is a seventh embodiment of the invention.
Figure 21:
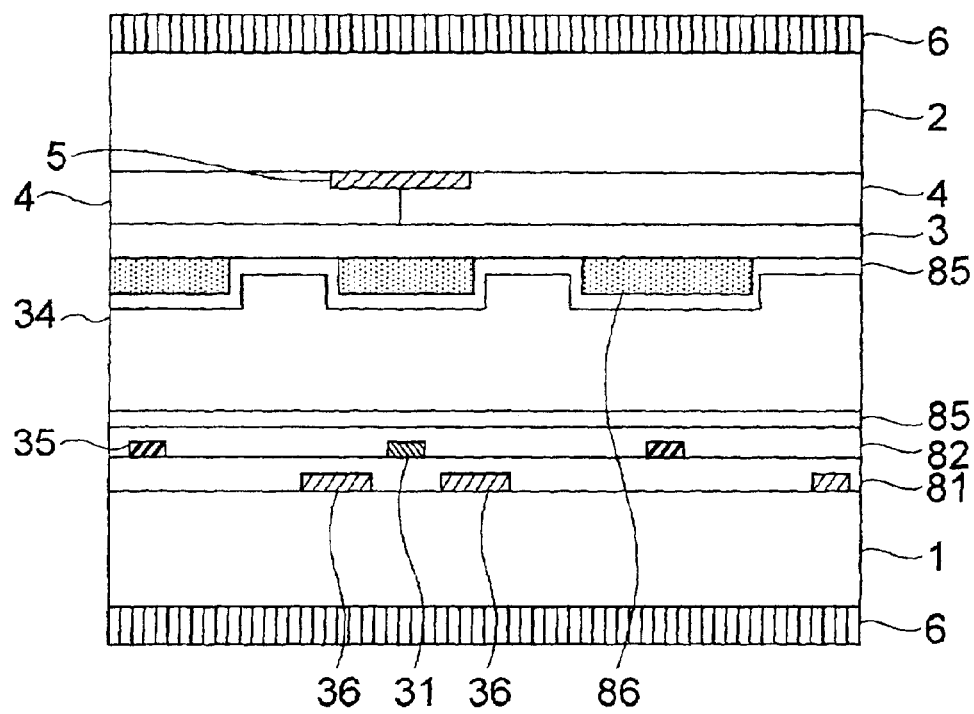
FIG. 21 illustrates a configuration of a pixel and its vicinity in a section of the liquid crystal display apparatus, which is the seventh embodiment of the invention.

The configuration of the circuit arrangement pattern in a pixel and its vicinity over the substrate 1 in Embodiment 7 is the same as in FIG. 14. FIG. 20 illustrates the configuration of the circuit arrangement pattern in a pixel and its vicinity over the substrate 2 in this embodiment. FIG. 21 shows an A–A' section in FIG. 20.

In Embodiment 7, the extending direction DLd of the level gap accompanying the concave and convex portions formed by the second insulating film 86 is identical with the initial orientation DLe of the liquid crystal. As a result, when the alignment film 85 is to be rubbed, there is no riding over any level gap accompanying concave and convex portions in the light-transmissive region, making it possible to achieve uniform rubbing and difficult to induce misalignment.
(Embodiment 8)

Embodiment 8 differs from Embodiment 7 in the arrangement and shape of the second insulating film. These differences will be described with reference to FIG. 22 and FIG. 23. This embodiment matches claim 8.

Figure 22:
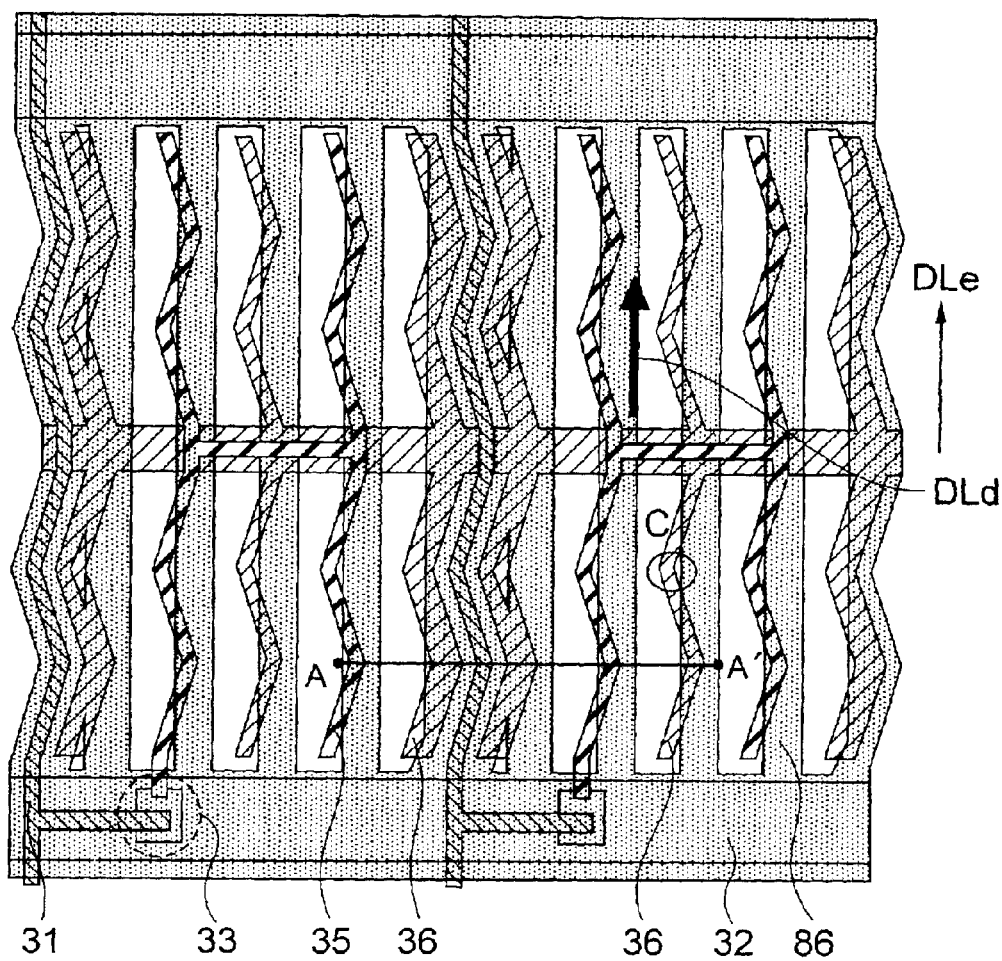
FIG. 22 illustrates a configuration of a circuit arrangement pattern in a pixel and its vicinity in a liquid crystal display apparatus, which is an eighth embodiment of the invention.
Figure 23:
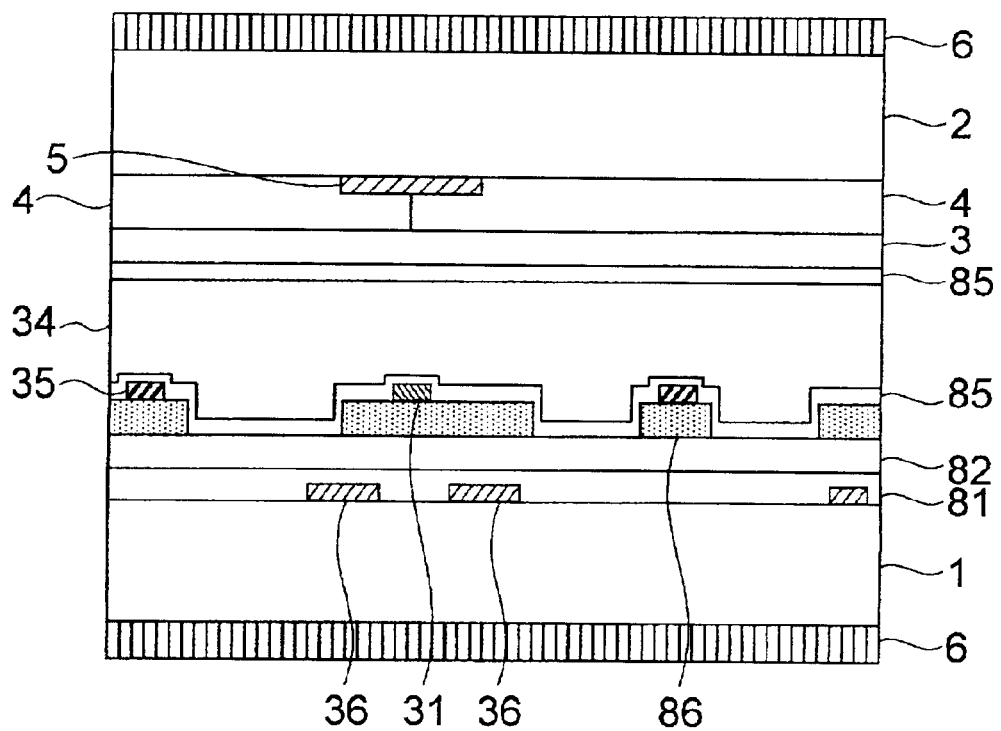
FIG. 23 illustrates a configuration of a pixel and its vicinity in a section of the liquid crystal display apparatus, which is the eighth embodiment of the invention.

FIG. 22 illustrates the configuration of the circuit arrangement pattern in a pixel and its vicinity over the substrate 1 in Embodiment 8. FIG. 23 shows an A–A' section in FIG. 22.

The substrate 1 has the common electrodes 36, the scanning line 32 (not shown in FIG. 23), the first insulating film 81 arranged over the common electrodes 36, the protective film 82 arranged over the first insulating film 81, the second insulating film 86 arranged over the protective film 82 and forming concave and convex portions to vary the thickness of the liquid crystal layer 34, the signal lines 31 arranged over the second insulating film 86, the pixel electrodes 35 arranged in a higher layer than the second insulating film 86 and generating an electric field having components matching the common electrodes 36 and parallel to the surface of the substrate 1, the alignment film 85 provided over the pixel electrodes 35, and the polarizer 6 provided on the other side than the liquid crystal side of the substrate 1 and varying its optical characteristics according to the alignment of the liquid crystal. The common electrodes 36 are arranged over the substrate 1 together with the scanning lines 32.

The substrate 2 has the light shielding film 5 for shielding against unnecessary lights from gaps; the color filter 4, provided over the light shielding film 5, for expressing colors respectively corresponding to R, G and B; the flattening film 3, provided over the color filter 4, for flattening the unevenness of the filter; the alignment film 85 provided over the flattening film 3; and the polarizer 6 provided over the other side than the liquid crystal side of the substrate 2.

In Embodiment 8, unlike in Embodiment 7, the second insulating film 86 for forming concave and convex portions to vary the thickness of the liquid crystal layer is arranged over the substrate 1. As a result, even if the substrate 1 and the substrate 2 are misaligned with each other, the second insulating film 86 remains unaffected, and accordingly the effect to shorten the response time of the liquid crystal is unchanged.

Furthermore in Embodiment 8, unlike in Embodiment 4, the extending direction DLd of the level gap accompanying the concave and convex portions formed by the second insulating film 86 is identical with the initial orientation DLe of the liquid crystal. For this reason, when the alignment film 85 is to be rubbed, there is no riding over any level gap accompanying concave and convex portions in the light-transmissive region, making it possible to achieve uniform rubbing and difficult to induce misalignment or the like.
(Embodiment 9)

Embodiment 9 differs from Embodiment 8 only in the arrangement and shapes of the second insulating film 86, the pixel electrodes 35 and the common electrodes 36. These differences will be described with reference to FIG. 24. This embodiment matches claim 12.

Figure 24:
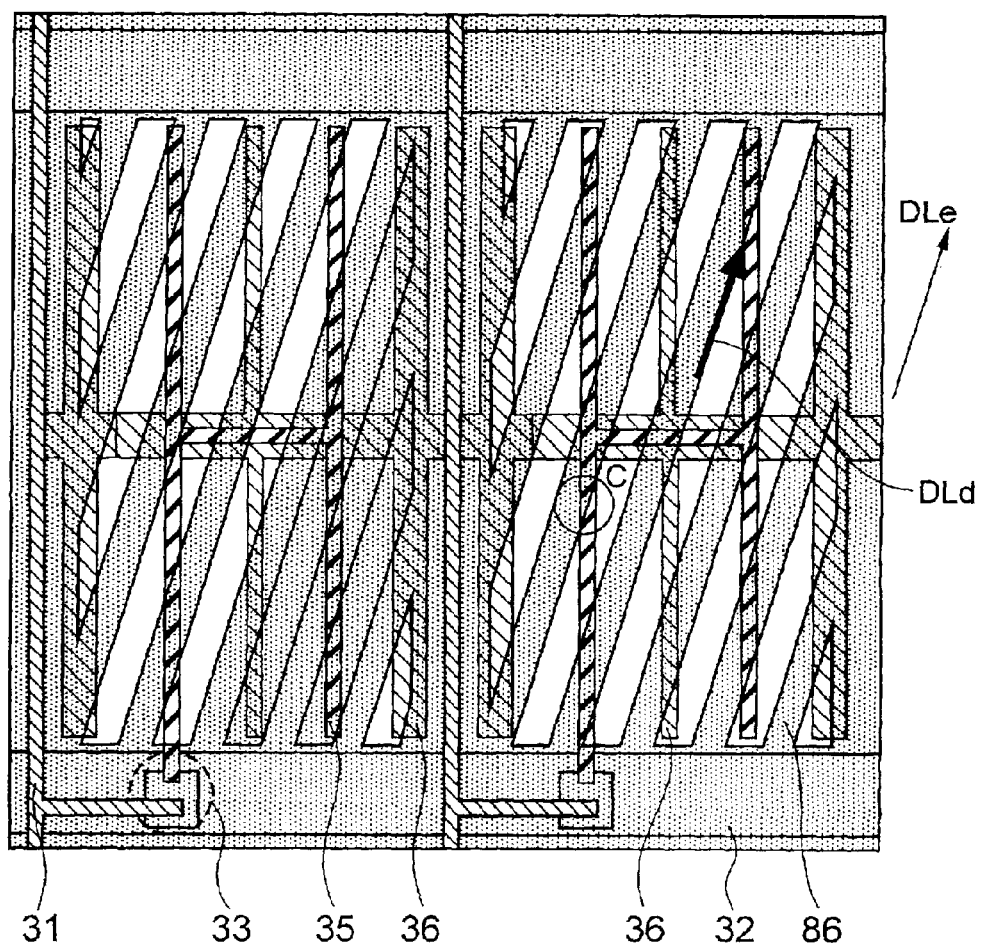
FIG. 24 illustrates a configuration of a circuit arrangement pattern in a pixel and its vicinity in a liquid crystal display apparatus, which is a ninth embodiment of the invention.

FIG. 24 illustrates the configuration of a circuit arrangement pattern in a pixel and its vicinity over the substrate 1 in Embodiment 9. In Embodiment 9, unlike in Embodiment 8, the pixel electrodes 35 and the common electrodes 36 are not bent. As a result, the rubbing direction is inclined by 15 degrees relative to the extending direction of the signal lines 31. However, this embodiment is the same as Embodiment 8 in that the angle formed by one side of each pixel electrode 35 and the rubbing direction is 15 degrees.

The extending direction of the level gap accompanying the concave and convex portions formed by the second insulating film 86 is inclined by 15 degrees relative to the extending direction of the signal lines 31. However, it is the same as in Embodiment 8 in that the extending direction DLd of the level gap accompanying the concave and convex portions formed by the second insulating film 86 is identical with the initial orientation DLe of the liquid crystal.

For this reason, as in Embodiment 8, when the alignment film 85 is to be rubbed in Embodiment 9, there is no riding over any level gap accompanying concave and convex portions in the light-transmissive region, making it possible to achieve uniform rubbing and difficult to induce misalignment or the like.

(Embodiment 10)

Embodiment 10 differs from Embodiment 8 in the arrangement and shape of the second insulating film. This difference will be described with reference to FIG. 25 and FIG. 26. This embodiment matches claim 13.

Figure 25:
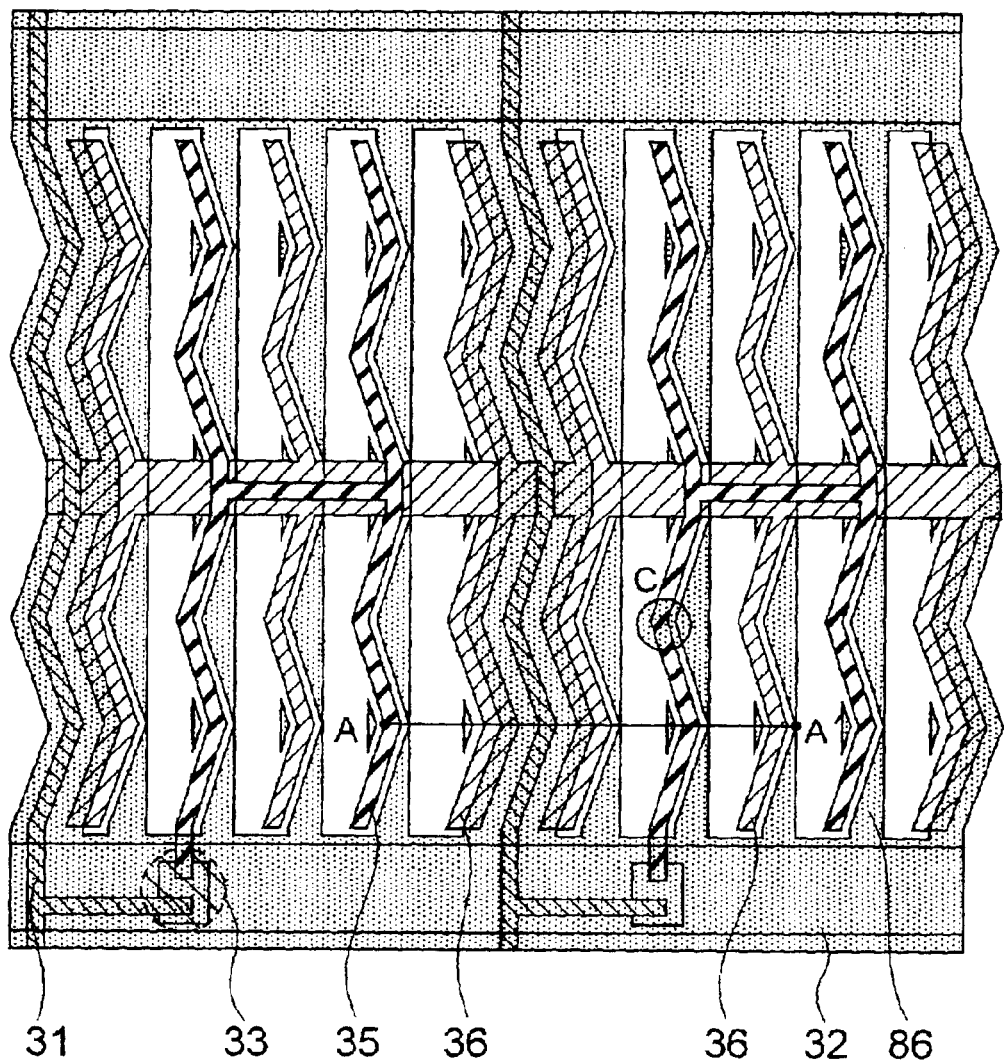
FIG. 25 illustrates a configuration of a circuit arrangement pattern in a pixel and its vicinity in a liquid crystal display apparatus, which is a 10th embodiment of the invention.
Figure 26:
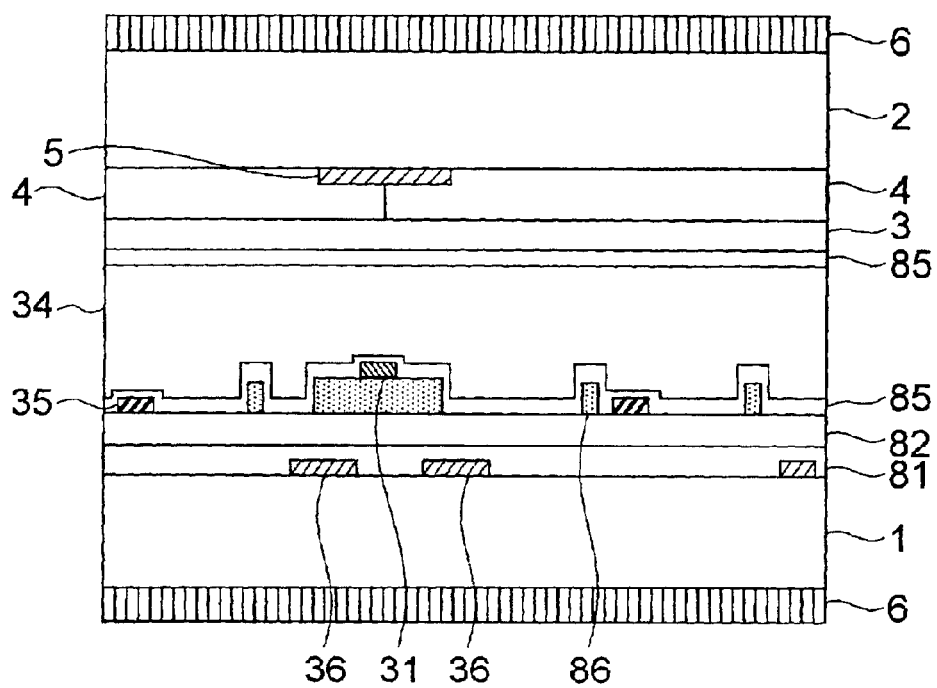
FIG. 26 illustrates a configuration of a pixel and its vicinity in a section of the liquid crystal display apparatus, which is the 10th embodiment of the invention.

FIG. 25 illustrates the configuration of a circuit arrangement pattern in a pixel and its vicinity over the substrate 1 in Embodiment 10. FIG. 26 shows an A–A' section in FIG. 25.

In Embodiment 10, unlike in Embodiment 8, the pixel electrode 35 and the common electrode 36 do not ride over any level gap accompanying concave and convex portions attributable to the second insulating film 86. For instance in portion C of Embodiment 8 shown in FIG. 22, the pixel electrode 35 rides over an edge of the second insulating film 86. On the other hand, in portion C of Embodiment 10 shown in FIG. 25, the pixel electrode 35 does not ride over the second insulating film 86. Thus to look at a section in FIG. 22 parallel to the A–A' section, while some portions of the pixel electrodes 35 are on the second insulating film 86 (above the level gap) and others are on the protective film 82 (below the level gap), in FIG. 25 the second insulating film 86 is arranged away from the pixel electrodes 35. In any section parallel to the A–A' section, the pixel electrode 35 is on the protective film 82 (below the level gap).

For this reason in Embodiment 10, there can arise no such failure as any of the pixel electrodes 35 being cut by a level gap accompanying concave and convex portions attributable to the second insulating film 86.

(Embodiment 11)

Embodiment 11 differs from Embodiment 10 in the arrangement and shape of the second insulating film. This difference will be described with reference to FIG. 27 and FIG. 28. This embodiment matches claim 14.

Figure 27:
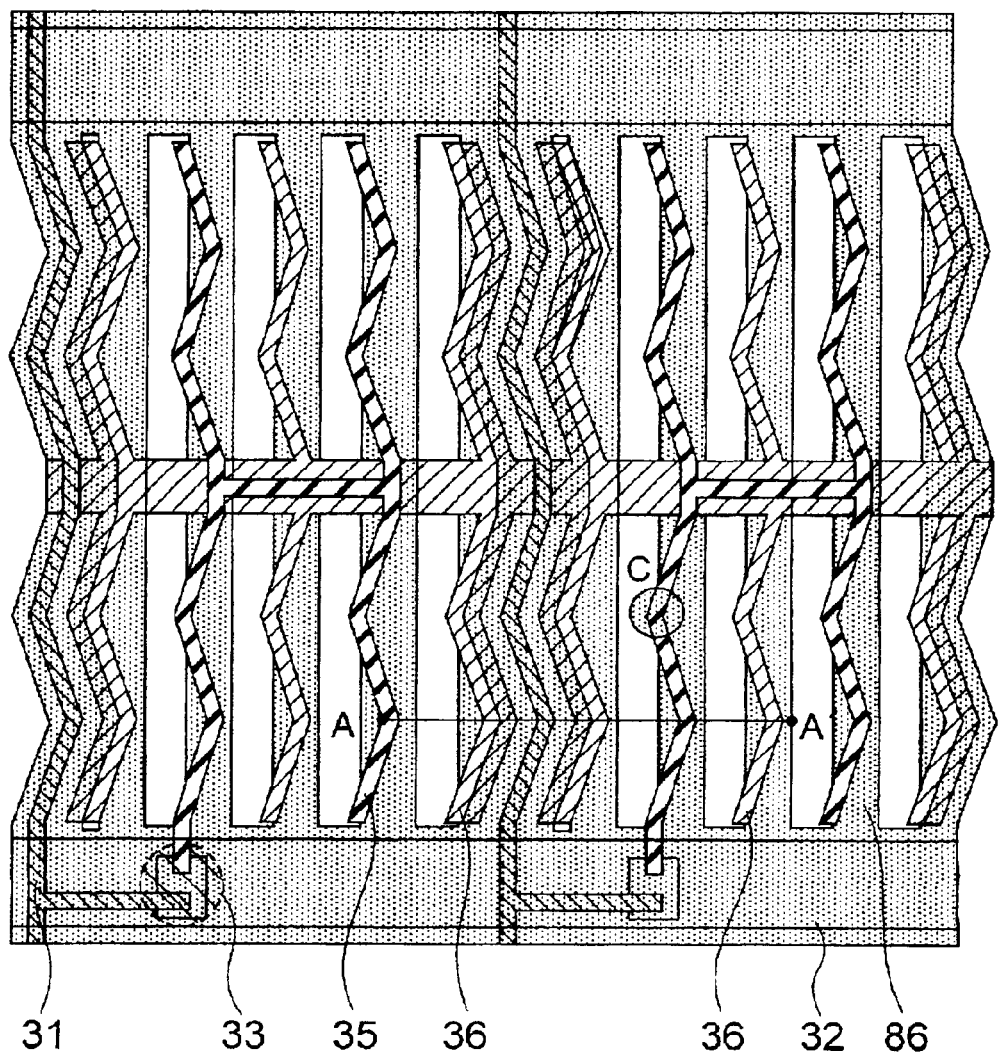
FIG. 27 illustrates a configuration of a circuit arrangement pattern in a pixel and its vicinity in a liquid crystal display apparatus, which is an 11th embodiment of the invention.
Figure 28:
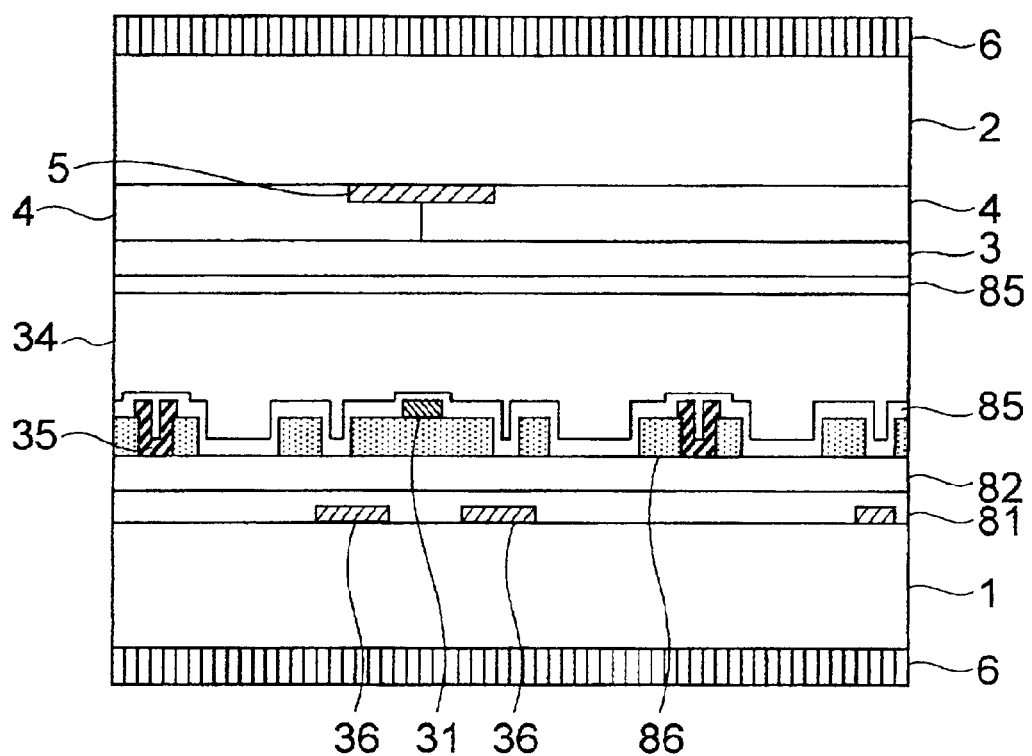
FIG. 28 illustrates a configuration of a pixel and its vicinity in a section of the liquid crystal display apparatus, which is the 11th embodiment of the invention.

FIG. 27 illustrates the configuration of a circuit arrangement pattern in a pixel and its vicinity over the substrate 1 in Embodiment 11. FIG. 28 shows an A–A' section in FIG. 27.

In Embodiment 11, unlike in Embodiment 10, level gaps accompanying concave and convex portions attributable to the second insulating film 86 are superposed over the pixel electrode 35 and the common electrode 36. For instance in portion C of Embodiment 10 shown in FIG. 25, no level gap accompanying concave and convex portions attributable to the second insulating film 86 is superposed over the pixel electrode 35. On the other hand in portion C of Embodiment 11 shown in FIG. 27, a level gap accompanying concave and convex portions attributable to the second insulating film 86 is superposed over the pixel electrode 35.

For this reason in Embodiment 11, even if rubbing becomes insufficient in any level gap portion accompanying concave and convex portions attributable to the second insulating film 86 and misalignment occurs as a result, the display will not be affected because the failure is hidden by the pixel electrode 35 and the common electrode 36 if these electrodes are opaque conductors.

Furthermore in Embodiment 11, as in Embodiment 10, level gaps accompanying concave and convex portions attributable to the second insulating film 86 are superposed, but do not ride, over the pixel electrode 35 and the common electrode 36. Thus as shown in FIG. 27, the second insulating film 86 is arranged generally away from the pixel electrode 35, the pixel electrode 35 on its edge rides over the second insulating film 86. For this reason, in any section parallel to the A–A' section, the pixel electrode 35 is generally on the protective film 82 (below the level gap) and only its edge is on the second insulating film 86 (above the level gap).

As a result, as in Embodiment 10, there can arise no such failure as any of the pixel electrodes 35 being cut by a level gap accompanying concave and convex portions attributable to the second insulating film 86.

(Embodiment 12)

Embodiment 12 differs from Embodiment 9 in the arrangement and shape of the second insulating film. This difference will be described with reference to FIG. 29. This embodiment matches claims 13 and 14.

Figure 29:
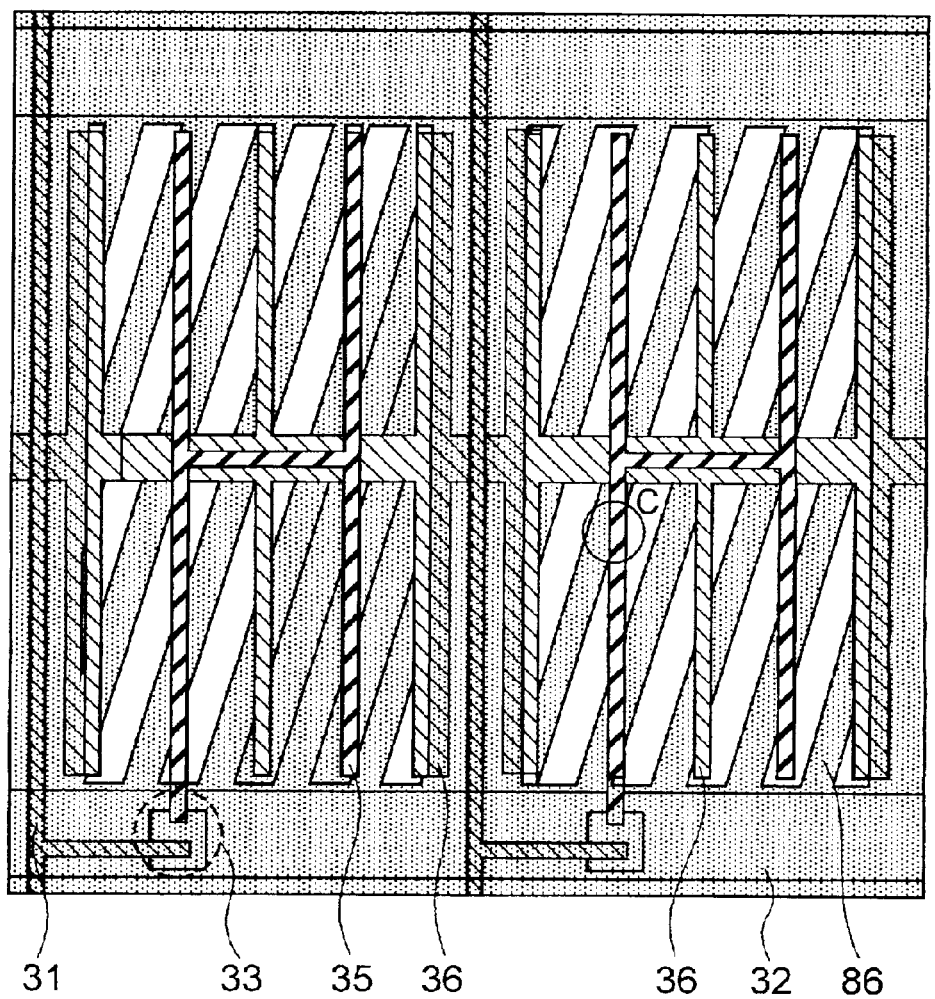
FIG. 29 illustrates a configuration of a circuit arrangement pattern in a pixel and its vicinity in a liquid crystal display apparatus, which is a 12th embodiment of the invention.

FIG. 29 illustrates the configuration of a circuit arrangement pattern in a pixel and its vicinity over the substrate 1 in Embodiment 12.

In Embodiment 12, unlike in Embodiment 9, the pixel electrode 35 and the common electrode 36 do not ride over any level gap accompanying concave and convex portions attributable to the second insulating film 86. For instance in portion C of Embodiment 9 shown in FIG. 24, the pixel electrode 35 does ride over an edge of the second insulating film 86. On the other hand, in portion C of Embodiment 12 shown in FIG. 29, the pixel electrode 35 is partly superposed, but does not ride over the second insulating film 86. Thus as shown in FIG. 29, while the second insulating film 86 is arranged generally away from the pixel electrode 35, the pixel electrode 35 on its edge rides over the second insulating film 86. For this reason, in any section parallel to the horizontal axis, the pixel electrode 35 is generally on the protective film 82 (below the level gap) and only its edge is on the second insulating film 86 (above the level gap).

As a result, in Embodiment 12, as in Embodiment 10, there can arise no such failure as any of the pixel electrodes 35 being cut by a level gap accompanying concave and convex portions attributable to the second insulating film 86.

Furthermore, level gaps accompanying concave and convex portions attributable to the second insulating film 86 are superposed over the pixel electrode 35 and the common electrode 36.

For this reason in Embodiment 12, even if rubbing becomes insufficient in any level gap portion accompanying concave and convex portions attributable to the second insulating film 86 and misalignment occurs as a result, the display will not be affected because the failure is hidden by the pixel electrode 35 and the common electrode 36 if these electrodes are opaque conductors.

(Embodiment 13)

Embodiment 13 differs from Embodiment 11 in the arrangement and shape of the second insulating film. This difference will be described with reference to FIG. 30 and FIG. 31. This embodiment matches claims 6, 9, 12 and 13.

Figure 30:
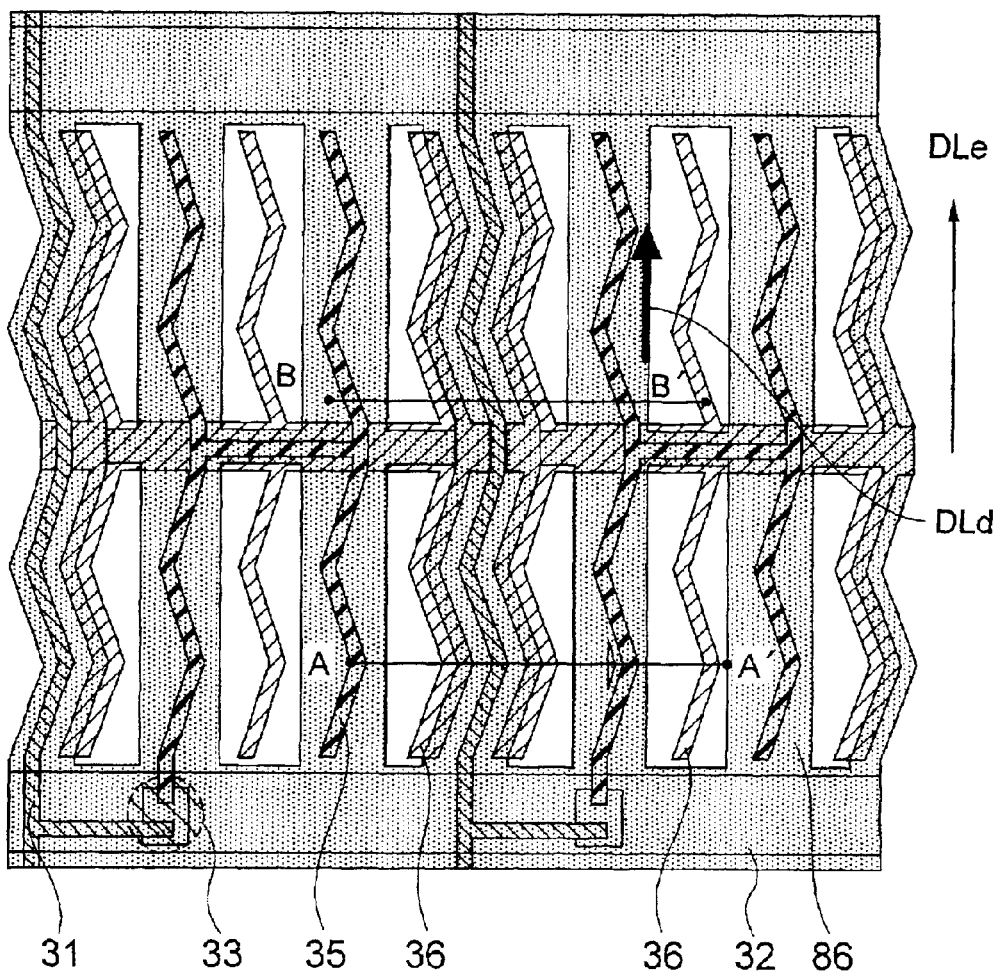
FIG. 30 illustrates a configuration of a circuit arrangement pattern in a pixel and its vicinity in a liquid crystal display apparatus which is a 13th embodiment of the invention.
Figure 31:
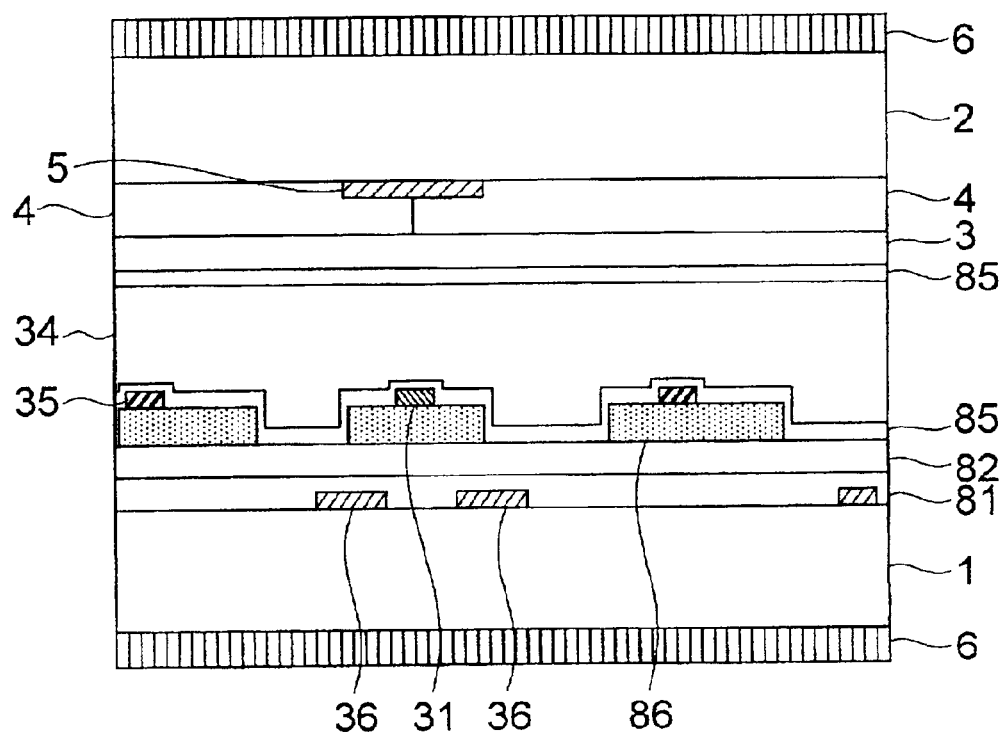
FIG. 31 illustrates a configuration of a pixel and its vicinity in a section of the liquid crystal display apparatus, which is the 13th embodiment of the invention.

FIG. 30 illustrates the configuration of a circuit arrangement pattern in a pixel and its vicinity in Embodiment 13. FIG. 31 shows an A–A' section in FIG. 30.

In Embodiment 13, unlike in Embodiment 11, between the pixel electrode 35 and the common electrode 36, there is only one level gap attributable to the formation of concave and convex portions by the second insulating film 86. The pixel electrodes 35 are superposed over convex portions, and the common electrodes 36 are superposed over concave portions.

This results in a greater width of the concave-convex pattern than in Embodiment 11, enabling the second insulating film 86 to be more easily machined.

Incidentally, as the pixel electrodes 35 are arranged in a higher layer than the second insulating film 86, the electric field can be applied to the liquid crystal layer 34 without going through the second insulating film 86. As a result the drive voltage can be kept lower than otherwise.

Furthermore, as the extending direction DLd of the level gap accompanying the concave and convex portions formed by the second insulating film 86 is identical with the initial orientation DLe of the liquid crystal, when the alignment film 85 is to be rubbed, there is no riding over any level gap accompanying concave and convex portions in the light-transmissive region, making it possible to achieve uniform rubbing and difficult to induce misalignment or the like.

In addition, as in the light-transmissive region the pixel electrodes 35 and the common electrodes 36 ride over no level gap accompanying concave and convex portions attributable to the second insulating film 86, there can arise no such failure as any of the pixel electrodes 35 being cut by a level gap. Thus as shown in FIG. 30, the pixel electrodes 35 and the signal lines 31 are wholly formed over the second insulating film 86 without riding over any level gap.

(Embodiment 14)

Embodiment 14 differs from Embodiment 13 in the arrangement and shapes of the signal lines 31, the pixel electrodes 35, the common electrodes 36 and the second insulating film 86. These differences will be described with reference to FIG. 32 and FIG. 33. This embodiment matches claim 15.

Figure 32:
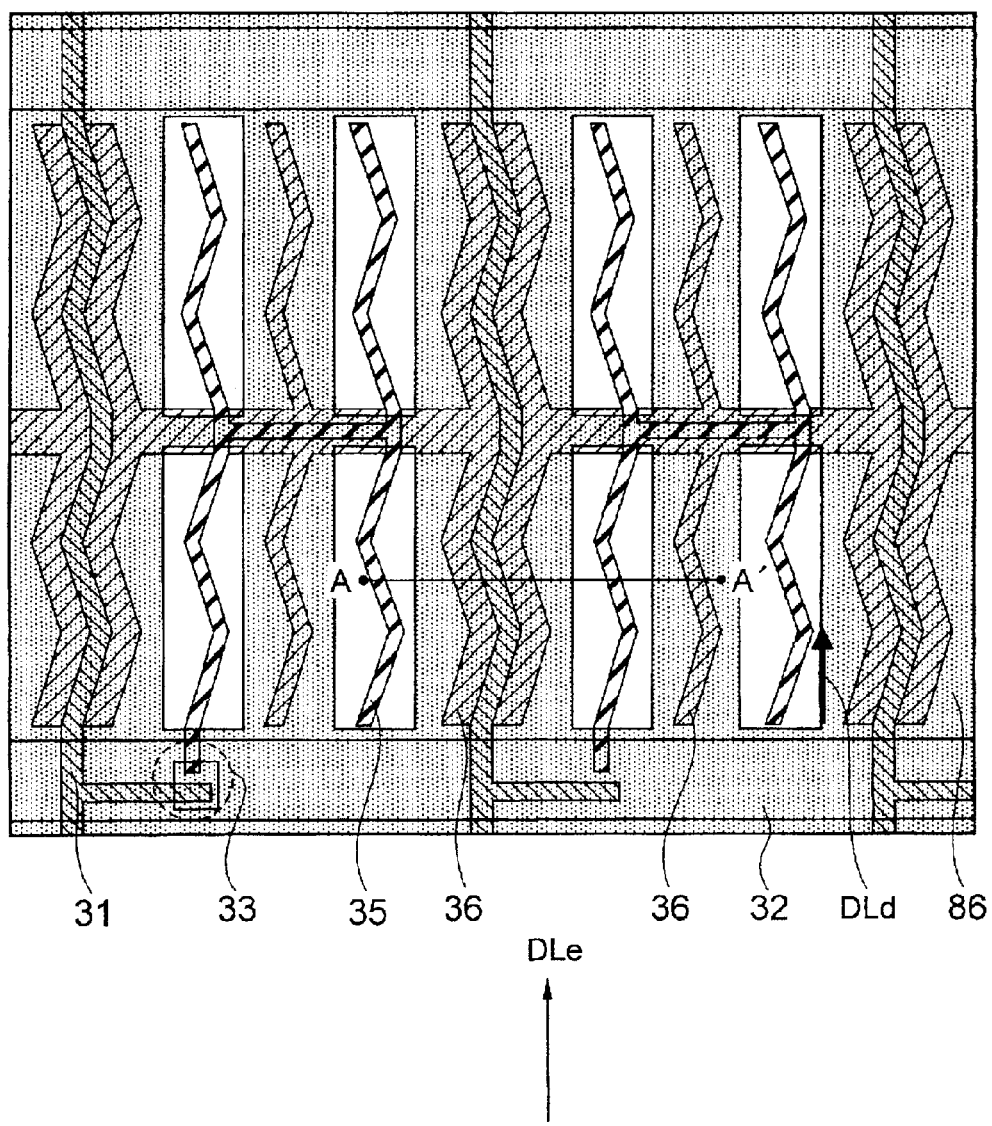
FIG. 32 illustrates a configuration of a circuit arrangement pattern in a pixel and its vicinity in liquid crystal display apparatuses, which are 14th and 17th embodiments of the invention.

FIG. 32 illustrates the configuration of the circuit arrangement pattern in a pixel and its vicinity in Embodiment 14. The scanning lines 32 and the signal lines 31 cross each other, and a pixel is formed matching an area surrounded by scanning lines 32 and signal lines 31. Each of the first TFTs 33 is arranged in a matching way near the intersection between a scanning line 32 and a signal line 31, and electrically connected to the scanning line 32, the signal line 31 and the pixel electrode 35. Each of the common electrodes 36 is arranged matching a pixel electrode 35, and the common electrode 36 and the pixel electrode 35 generate an electric field whose components are parallel to the substrate surface. The pixel electrode 35, the common electrode 36 and the signal line 31 are bent once or more within each pixel to constitute a multi-domain. The second insulating film 86 is arranged in the light-transmissive region between the pixel electrode and the common electrode, and serves to vary the thickness of the liquid crystal layer 34. The signal lines 31 and the common electrodes 36 are superposed with the second insulating film 86 between them.

Figure 33:
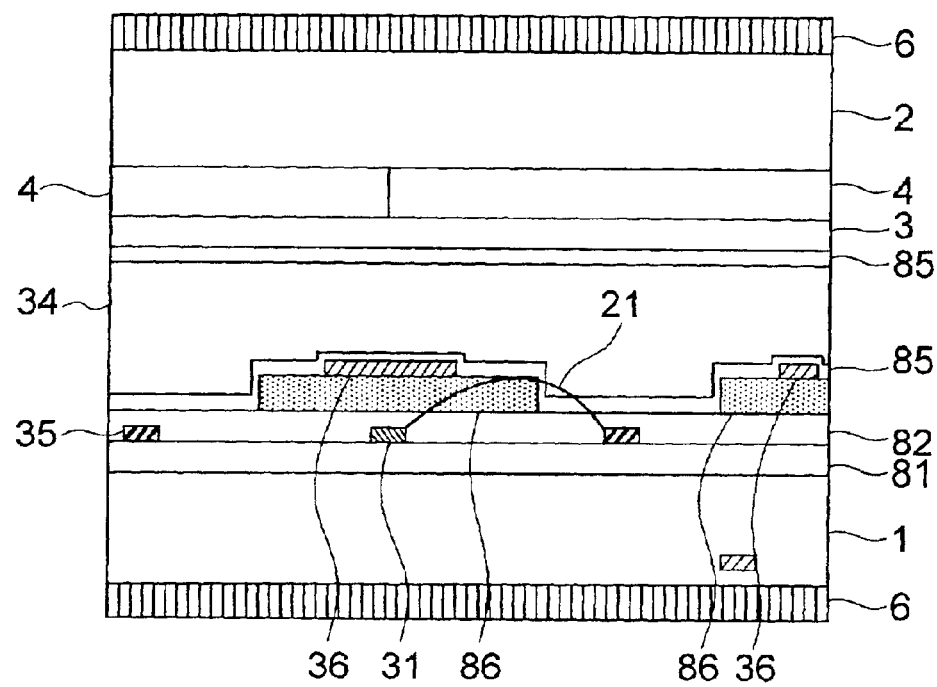
FIG. 33 illustrates a configuration of a pixel and its vicinity in a section of the liquid crystal display apparatus, which is the 14th embodiment of the invention.

FIG. 33 shows an A–A' section in FIG. 32. This configuration has the substrate 1 made of transparent glass, the substrate 2 arranged opposite the substrate 1 and also made of transparent glass, and the liquid crystal layer 34 held between the substrates 1 and 2.

The substrate 1 has the first insulating film 81, the signal lines 31 and the pixel electrodes 35 arranged over the first insulating film 81, the protective film 82 arranged over the signal lines 31 and the pixel electrodes 35, the second insulating film 86 arranged over the protective film 82, the common electrodes 36 superposed over the signal lines 31 with the second insulating film 86 in-between, the alignment film 85 arranged on the interface with the liquid crystal layer 34, and the polarizer 6 provided on the other side than the liquid crystal side of the substrate 1 and varying its optical characteristics according to the alignment of the liquid crystal. The common electrodes 36, together with the scanning lines 32 (not shown in FIG. 33), are arranged over the first insulating film 81.

The common electrodes 36, the pixel electrodes 35 and the signal lines 31 are made of conductors of about 0.2 $\mu$m in thickness, which may be CrMo, Al, indium tin oxide (ITO) or the like. The first insulating film 81 and the protective film 82 are made of insulators of respectively about 0.3 $\mu$m and 0.8 $\mu$m in thickness, which may be silicon nitride or the like. The second insulating film 86 is made of an insulator of about 1 $\mu$m in thickness, which may be either an inorganic or organic substance. To add, obviously the invention is not limited to the film thicknesses and materials stated above.

The substrate 2 has the light shielding film 5 for shielding against unnecessary lights from gaps; the color filter 4, provided over the light shielding film 5, for expressing colors respectively corresponding to R, G and B; the flattening film 3, provided on the color filter 4, for flattening unevenness; the alignment film 85 provided over the flattening film 3, and the polarizer 6 provided over the other side than the liquid crystal side of the substrate 2.

The alignment film 85 is rubbed to align the liquid crystal. The rubbing direction is parallel to the extending direction of the signal lines. The angle formed between one side of the bent pixel electrode and the rubbing direction is 15 degrees, matching the IPS display mode. The axis of transmission of the polarizer 6 is either parallel or normal to the rubbing direction of the alignment film on the substrate over which that particular polarizer is arranged, and the polarizer of the substrate 1 and the polarizer of the substrate 2 are in a cross Nicol arrangement, matching the normally black mode. Incidentally, the present invention is not limited to the above-stated rubbing angle, and further is applicable to the normally white mode as well.

Between the substrate 1 and the substrate 2, there are dispersed beads to secure an adequate thickness for the liquid crystal layer. Since the beads are also present on the convex portions, the beads on the convex portions determine the thickness of the liquid crystal layer. Therefore, in order to uniformize the average thickness of the liquid crystal layer for every pixel, it is desirable to increase the area of the convex portions. For this reason, the second insulating film 86 to make the surface uneven is arranged outside the display area within pixels, such as over the signal lines 31 and the scanning lines 32. To add, it is obvious that columnar spacers can as well be applied in place of the second insulating film 86.

The diameter of the beads is about 3 $\mu$m, and the refractive index anisotropy of the liquid crystal layer is about 0.1, the retardation being adjusted with this combination. To add, obviously, the applicability of the invention is not limited to this retardation.

There is no limitation regarding the back light (not shown) either. For instance, a straight down type or a side light type can be used.

Driving is accomplished in an active matrix system.

In Embodiment 14, as the thickness of the liquid crystal layer varies, the elastic energy is low in concave portions where the liquid crystal layer is thicker, and switching begins in the concave region when an electric field is applied between the pixel electrode 35 and the common electrode 36. Therefore, switching from the zero gray scale to the half gray scale can be quickened, making it possible to provide a liquid crystal display apparatus excelling in the quality of moving pictures displayed.

When an electric field is applied, switching begins in the region where the liquid crystal layer has a greater thickness (deff), i.e. the region where the effective retardation deff·Δneff is greater. Therefore, even when the drive voltage is low, the wavelength that maximizes the transmissivity is long, and yellow is emphasized. As a result, the problem that the color gray scale varies from blue to yellow along with a rise in drive voltage, which is experienced with the conventional liquid crystal display apparatus having no variation in the thickness of the liquid crystal layer illustrated, can be alleviated.

In Embodiment 14, unlike in Embodiment 13, the signal lines 31 and the common electrodes 36 are superposed with the second insulating film 86 between them, while in Embodiment 13, two common electrodes 36 arranged on each signal line 31 are put together. As a result, the aperture is increased without having to increasing masks at the photoresist step.

Furthermore in Embodiment 14, as the signal lines 31 and the common electrodes 36 are superposed with the second insulating film 86 between them unlike in Embodiment 13, the second insulating film can be given a greater square measure for the area superposed over the signal lines 31 in Embodiment 14 than in Embodiment 13, the ratio in square measure between the concave and convex portions being assumed to be equal in the light-transmissive region. Accordingly, as the thickness of the liquid crystal layer 34 is determined by the beads on the convex portions, it is easier in Embodiment 14 than in Embodiment 13 to uniformize the average thicknesses of the liquid crystal layer 34 in individual pixels over the whole area of the panel.

Also unlike in Embodiment 11, between the pixel electrode 35 and the common electrode 36, there is only one level gap attributable to the formation of concave and convex portions by the second insulating film 86. The pixel electrodes 35 are superposed over convex portions, and the common electrodes 36 are superposed over concave portions.

This results in a greater width of the concave-convex pattern than in Embodiment 11, enabling the second insulating film 86 to be more easily machined.

Incidentally, as the common electrode 36 superposed over the convex portions are arranged in a higher layer than the second insulating film 86, the electric field can be applied to the liquid crystal layer 34 without going through the second insulating film 86. As a result the drive voltage can be kept lower than otherwise.

Furthermore, as the extending direction DLd of the level gap accompanying the concave and convex portions formed by the second insulating film 86 is identical with the initial orientation DLe of the liquid crystal, when the alignment film 85 is to be rubbed, there is no riding over any level gap accompanying concave and convex portions in the light-transmissive region, making it possible to achieve uniform rubbing and difficult to induce misalignment or the like.

In addition, as in the light-transmissive region the pixel electrodes 35 and the common electrodes 36 ride over no level gap accompanying concave and convex portions attributable to the second insulating film 86, there can arise no such failure as any of the pixel electrodes 35 being cut by a level gap.

(Embodiment 15)

Embodiment 15 differs from Embodiment 14 in the shape and arrangement of the second insulating film 86. These differences will be described with reference to FIG. 34 and FIG. 35. This embodiment matches claim 16.

Figure 34:
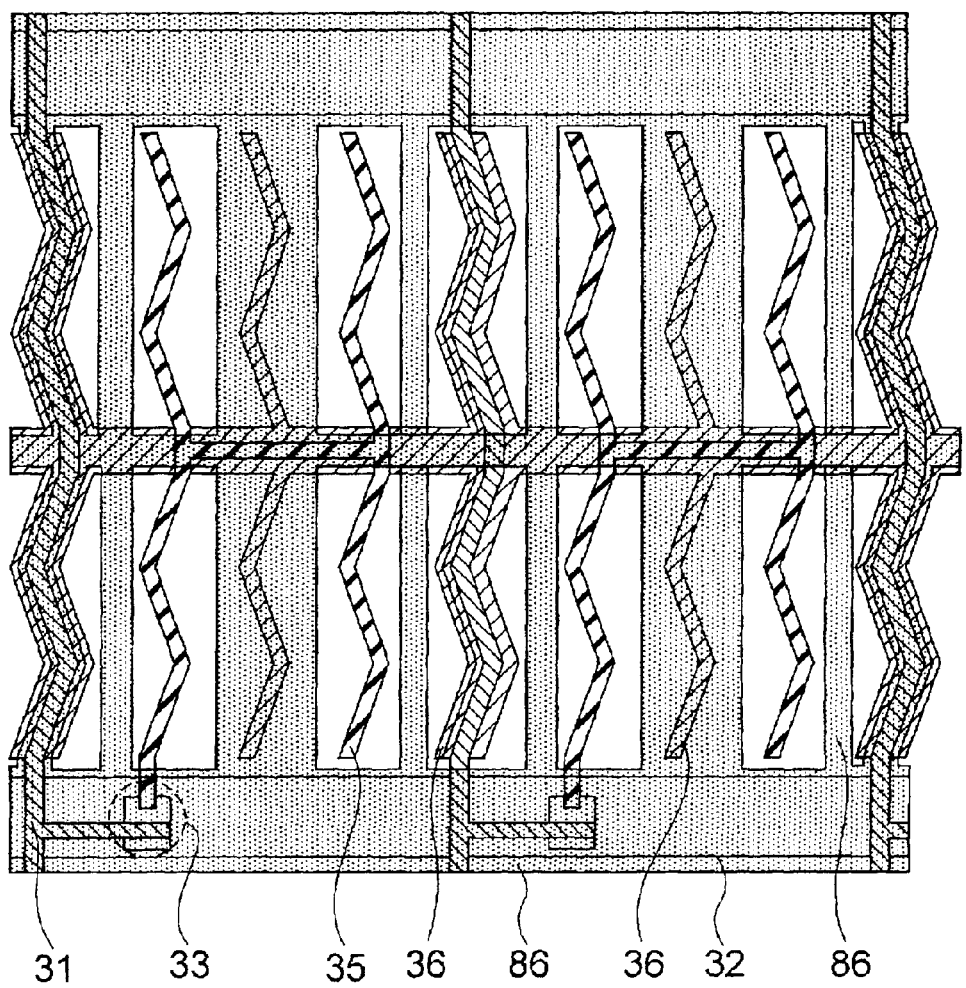
FIG. 34 illustrates a configuration of a circuit arrangement pattern in a pixel and its vicinity in a liquid crystal display apparatus, which is a 15th embodiment of the invention.
Figure 35:
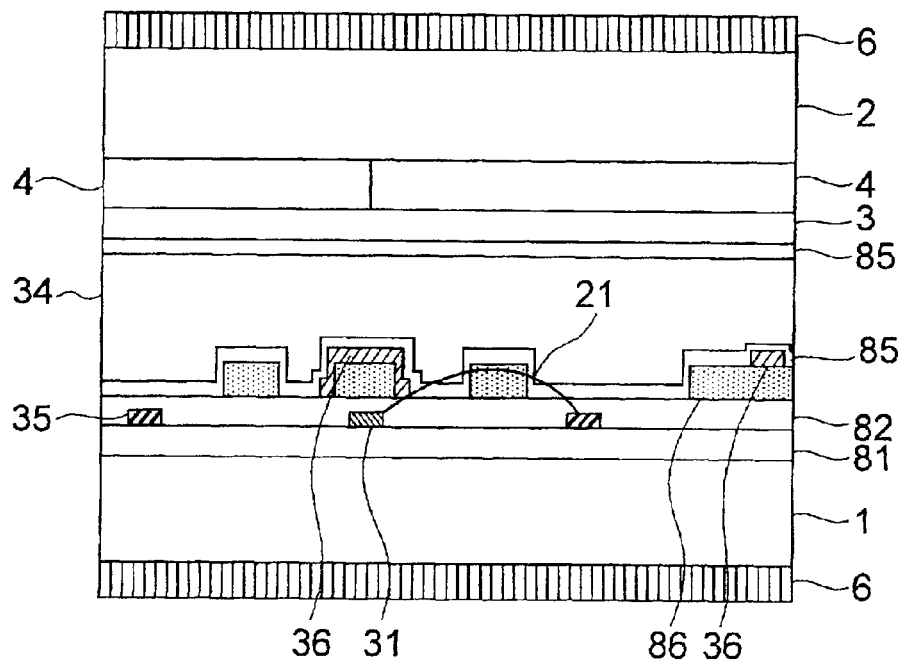
FIG. 35 illustrates a configuration of a pixel and its vicinity in a section of the liquid crystal display apparatus, which is the 15th embodiment of the invention.

FIG. 34 illustrates the configuration of a circuit arrangement pattern in a pixel and its vicinity in Embodiment 15. FIG. 35 shows an A–A' section in FIG. 34.

In Embodiment 15, unlike in Embodiment 14, the second insulating film 86 is selectively formed in a smaller width than that of the common electrodes 36 where the signal lines 31 and the common electrodes 36 are superposed. Accordingly, as shown in FIG. 35, the common electrodes 36 are formed in such a way that they cover the second insulating film 86. This makes it possible to cut off noise electric fields passing the concave portions of the second insulating film 86 and the liquid crystal layer 34 out of the unnecessary noise electric fields for displaying, generated between the signal lines 31 and the pixel electrodes 35 as indicated by the electric lines of force 21, and thereby to enhance the quality of displaying.

(Embodiment 16)

Embodiment 16 differs from Embodiment 14 in the shape and arrangement of the second insulating film 86. These differences will be described with reference to FIG. 36 and FIG. 37. This embodiment matches claim 17.

Figure 36:
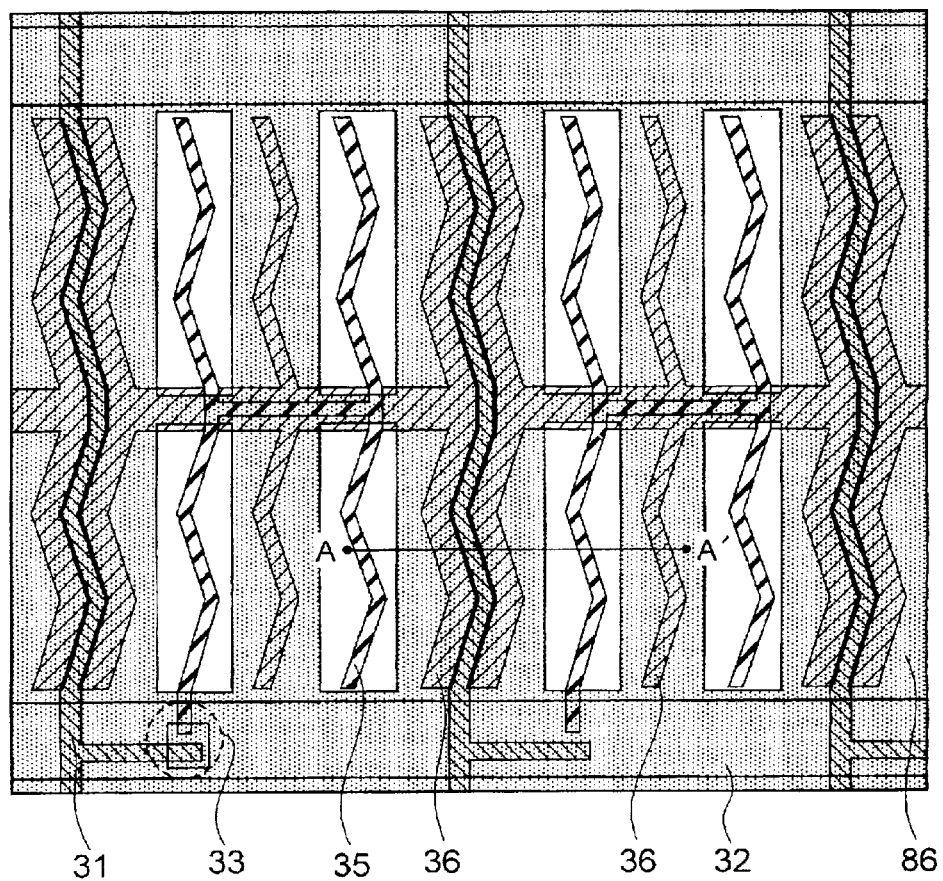
FIG. 36 illustrates a configuration of a circuit arrangement pattern in a pixel and its vicinity in a liquid crystal display apparatus, which is a 16th embodiment of the invention.
Figure 37:
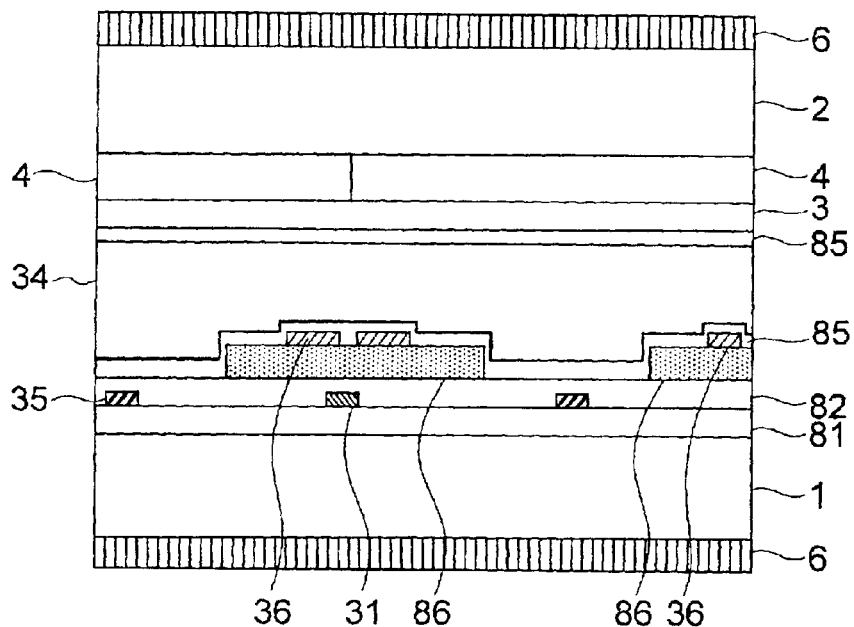
FIG. 37 illustrates a configuration of a pixel and its vicinity in a section of the liquid crystal display apparatus, which is the 16th embodiment of the invention.

FIG. 36 illustrates the configuration of a circuit arrangement pattern in a pixel and its vicinity in Embodiment 16. FIG. 37 shows an A–A' section in FIG. 36.

In Embodiment 16, unlike in Embodiment 14, the common electrodes 36 and the alignment film 85 are arranged over the second insulating film 86 where the signal lines 31 and the second insulating film 86 are superposed. Thus, while the common electrodes 36 are superposed all over the signal lines 31 (that means "all over" in the A–A' section shown in FIG. 36) in Embodiment 14 as shown in FIG. 33, in Embodiment 16 as shown in FIG. 37 the common electrodes 36 are superposed only over part of the signal lines 31.

Therefore, by varying the square measure of this superposed part, the capacitance generated between the signal lines 31 and the common electrodes 36 can be varied. This adjustment of the capacitance here is vital to inducing delays in the video signals passing the signal lines 31.

Thus, while the capacitance can only be varied in Embodiment 14 by varying the thickness of the second insulating film 86, the capacitance can be varied in Embodiment 16 not only by varying the thickness of the second insulating film 86 but also by varying the square measure of this superposed part in which the signal lines 31 and the common electrodes 36 are superposed. Therefore, the freedom of choosing the thickness of the second insulating film 86 is increased, and the thickness of the second insulating film can be determined so as to optimize the quickening effect of the unevenness of the thickness of the liquid crystal layer 34.

In other words, in Embodiment 16, the optimization of the thickness variation of the liquid crystal layer 34 and that of the capacitance between the signal lines 31 and the common electrodes 36 can be accomplished independent of each other.

(Embodiment 17)

Embodiment 17 differs from Embodiment 14 only in the shape of the protective film 82. This difference will be described with reference to FIG. 32 and FIG. 38. This embodiment matches claim 19.

Figure 38:
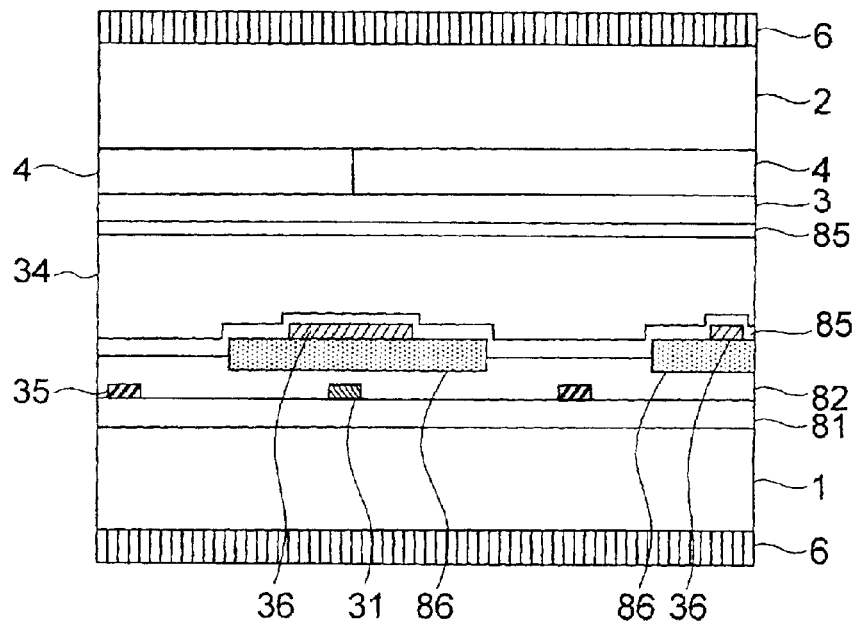
FIG. 38 illustrates a configuration of a circuit arrangement pattern in a pixel and its vicinity in a liquid crystal display apparatus, which is a 17th embodiment of the invention.

FIG. 32 illustrates the configuration of the circuit arrangement pattern in a pixel and its vicinity in Embodiment 17. FIG. 38 shows an A–A' section in FIG. 32.

In Embodiment 17, unlike in Embodiment 14, the protective film 82, which differs from the second insulating film 86 forming unevenness and yet is an insulating film having concave and convex portions is arranged over the substrate 1, and concave portions of the unevenness forming second insulating film 86 and protective film 82 are superposed. Thus, as shown in FIG. 38, since the protective film 82 has concave and convex portions in Embodiment 17 and the insulating film 86 is arranged in the concave portions of the protective film 82, the thickness of the liquid crystal layer varies less than in Embodiment 14.

Thus in Embodiment 17, the thickness of the liquid crystal layer 34 can be varied by controlling the thicknesses of both the second insulating film 86 and the protective film 82. Accordingly, it is possible to control the capacitance between the signal lines 31 and the common electrodes 36 by varying the thickness of the second insulating film and to control the thickness of the liquid crystal layer 34 by varying the combination of the thickness of the second insulating film 86 and the magnitudes of the concave and convex portions of the protective film 82.

In other words, in Embodiment 17, the optimization of the thickness variation of the liquid crystal layer 34 and that of the capacitance between the signal lines 31 and the common electrodes 36 can be accomplished independent of each other.

To add, a similar effect can as well be achieved forming from the outset the section of the protective film 82 in such a shape that combines the second insulating film 86 and the protective film 82 in this embodiment.

(Embodiment 18)

Embodiment 18 differs from Embodiment 1 only in driving method. This difference will be described with reference to FIG. 39. This embodiment matches claims 20 and 21.

Figure 39:
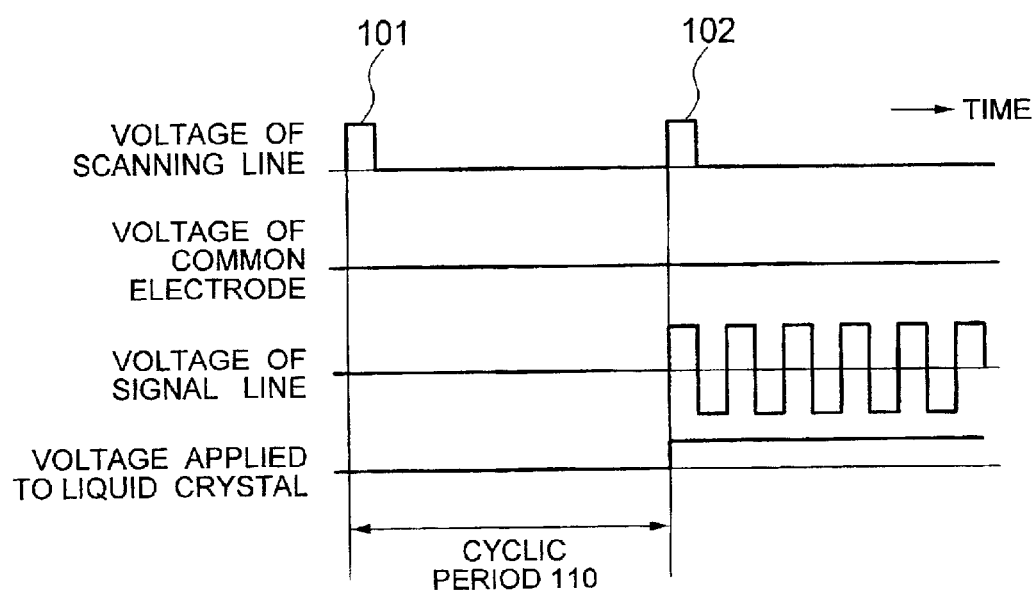
FIG. 39 illustrates electric voltage variations on different wiring lines and electrodes over time and variations in voltage applied to the liquid crystal over time in a liquid crystal display apparatus, which is an 18th embodiment of the invention.

FIG. 39 illustrates electric voltage variations on different wiring lines and electrodes over time and variations in voltage applied to the liquid crystal over time in Embodiment 18.

In Embodiment 18, two selection pulses are supplied to the scanning lines in one cyclic period 110. At a first selection pulse 101, the same voltage is supplied to the pixel electrodes as to the common electrodes, the voltage applied to the liquid crystal is reduced to zero, and this liquid crystal display apparatus in the normally black display mode displays a black gray scale. In the same cyclic period 110, at the next selection pulse 102, a voltage for picture displaying is supplied to the pixel electrodes, and this liquid crystal display apparatus varies from the black gray scale to a gray scale for picture displaying.

Thus, Embodiment 18 uses a driving method having means for equalizing the voltage of the pixel electrodes and that of the common electrodes within one cyclic period of displaying a picture.

For this reason, when the brightness of each pixel varies to a gray scale displaying a picture, it always does so from the black gray scale to a gray scale for picture displaying.

Since Embodiment 18 has a configuration permitting the response time from the black gray scale to a half gray scale to be reduced, combining the driving method and circuitry described above would result in frequent use of quickened switching from the black gray scale to a half gray scale and a consequent improvement in the display quality of moving pictures.

To add, active matrix driving in Embodiment 1 is replaced by the driving method described above in Embodiment 18. Therefore, obviously Embodiment 2 through Embodiment 17, in which active matrix driving is used, can also give the same effect as Embodiment 18 does if the driving method is similarly replaced.

(Embodiment 19)

Embodiment 19 differs from Embodiment 18 only in driving method. This difference will be described with reference to FIG. 40 and FIG. 41. This embodiment matches claim 22. Incidentally, if the configuration uses a back light source, Embodiments 18 and 19 will match claim 23.

Figure 40:
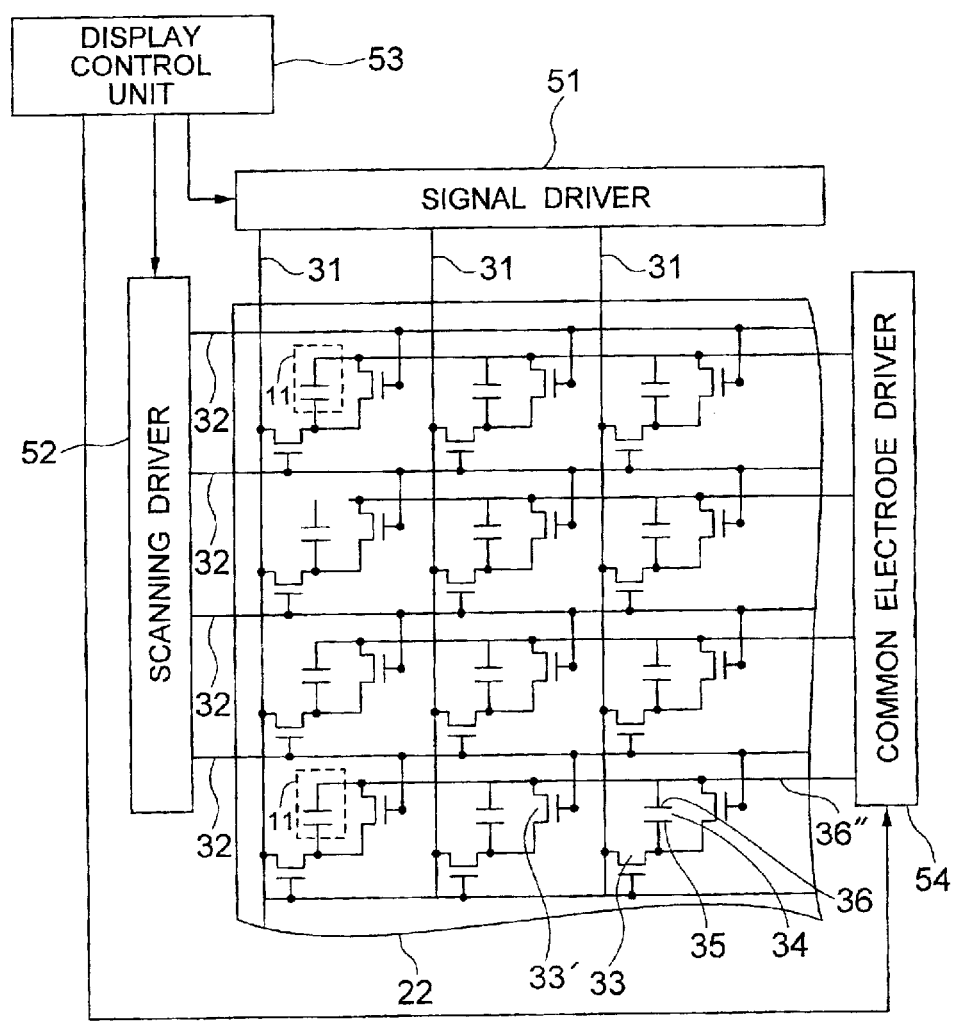
FIG. 40 illustrates a configuration of a liquid crystal display apparatus, which is a 19th embodiment of the invention.

FIG. 40 illustrates the configuration of a liquid crystal display apparatus, which is Embodiment 19 of the invention. The liquid crystal display apparatus embodying the invention in this mode has the signal driver 51 for supplying signal voltages to the pixel electrodes 35, the scanning driver 52 for supplying voltages for pixel selection, the common electrode driver 54 for supplying voltages to the common electrodes 36, and the display control unit 53 for controlling the signal driver 51, the scanning driver 52 and the common electrode driver 54.

The substrate 1 is provided with a plurality of scanning lines 32 connected to the scanning driver 52, the signal lines 31 connected to the signal driver 51 and crossing the scanning lines 32, the first TFTs 33 arranged matchingly near the intersections between the scanning lines 32 and the signal lines 31 and electrically connected to some scanning lines 32 and the signal lines 31, the pixel electrodes 35 electrically connected to the first TFTs 33 and matching the signal lines 31, the common electrodes 36 matching the pixel electrodes 35, second TFTs 33' electrically connected to different scanning lines from the scanning lines 32 to which the first TFTs 33 are connected, the pixel electrodes 35 and the common electrodes 36; and common electrode wiring lines 36" electrically connected to the common electrodes 36 and the common electrode driver 54.

Figure 41:
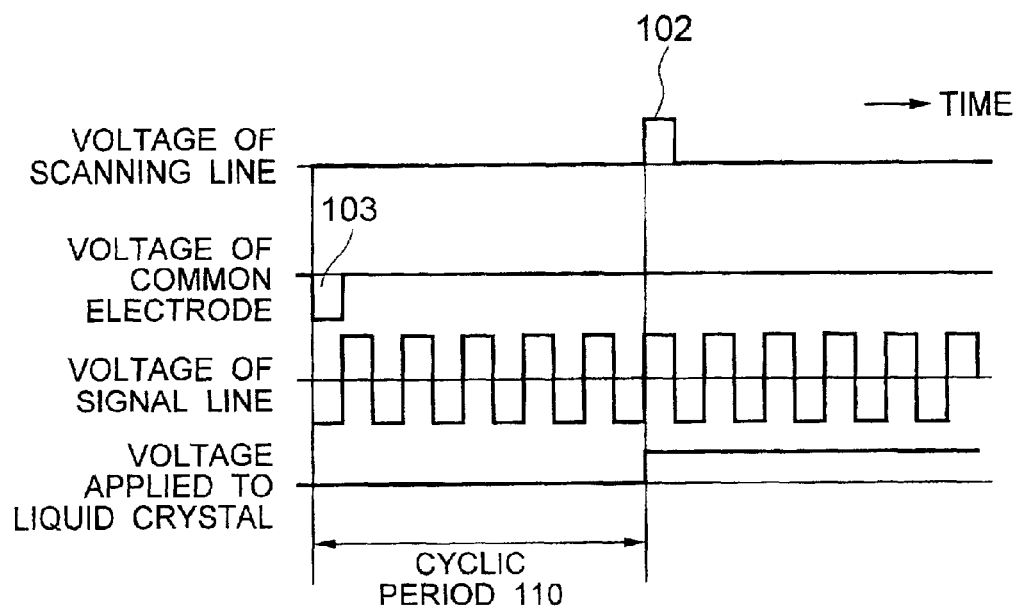
FIG. 41 illustrates electric voltage variations on different wiring lines and electrodes over time and variations in voltage applied to the liquid crystal over time in the liquid crystal display apparatus, which is the 19th embodiment of the invention.

FIG. 41 illustrates electric voltage variations on different wiring lines and electrodes over time and variations in voltage applied to the liquid crystal over time in Embodiment 19. In the driving of Embodiment 19, as shown in FIG. 41, supplying of a negative selection pulse 103 to the common electrodes 36 via the common electrode wiring lines 36" results in equivalence to the selection of those of the scanning lines 32 to which the second TFTs 33' are connected as shown in FIG. 40, with the result that the second TFTs 33' are turned on, the voltage of the pixel electrodes 35 and that of the common electrodes 36 become equal, and this liquid crystal display apparatus in the normally black display mode displays a black gray scale. In this case, as the scanning lines 32 are successively selected from the first to the m-th, only the second TFT 33' that is connected to the scanning line selected at the time the common electrode wiring line 36" is driven is turned on, and the voltage of the pixel electrode 35 and that of the common electrode 36 become equal. Then by the selection pulse 102 in the same cyclic period 110, a voltage for displaying a picture is supplied to the pixel electrode, and this liquid crystal display apparatus varies from the black gray scale to a gray scale for picture displaying. As the next scanning line 32 is selected in this case, only the first TFT 33 connected to the pixel electrode 35 having taken on the same voltage as the common electrode is turned on, and a voltage for displaying a picture is supplied to the pixel electrode. In this manner, as the scanning line is successively selected from the first to the m-th, the pixel electrode that is connected to the scanning line is successively selected, so that a voltage for displaying a picture is supplied after once taking on a voltage equal to that of the common electrode.

Thus, Embodiment 19 uses a driving method using means to equalize the voltage of the pixel electrodes and that of the common electrodes in one cyclic period of displaying one picture.

For this reason, whenever the brightness of each pixel varies to a gray scale for displaying a picture, the gray scale varies from black to a gray scale for displaying a picture.

Since Embodiment 19 has a configuration permitting the response time of variation from the black gray scale to an intermediate to be shortened, combining the driving method and circuitry described above would result in frequent use of quickened switching from the black gray scale to a half gray scale and a consequent improvement in the display quality of moving pictures.

Furthermore in Embodiment 19, unlike in Embodiment 18, the means of equalizing the voltage of the pixel electrodes and that of the common electrodes is independent of the signal lines 31, the supplying a voltage for displaying a picture and the equalization of the voltage of the pixel electrodes and that of the common electrodes can be accomplished at the same point of time for different pixels, the ratio between the duration of black gray scale displaying and that of picture displaying can be altered as desired.

To add, active matrix driving in Embodiment 1 is replaced by the driving method described above in Embodiment 19. Therefore, obviously Embodiment 2 through Embodiment 17, in which active matrix driving is used, can also give the same effect as Embodiment 19 does if the driving method is similarly replaced.

(Embodiment 20)

Embodiment 20 differs from Embodiment 1 in that, instead of rubbing, a layer of a photosensitive material is arranged in the region in contact with the liquid crystal layer to apply optical alignment. This embodiment matches claim 24. Thus, a material suitable for optical alignment is used as the alignment film 85, and the initial orientation of the liquid crystal layer 34 is determined by irradiation with a substantially linear deflected light. As a result, misalignment or the like is made difficult to occur in any level gap attributable to unevenness. The applicable photosensitive materials include polyvinylcinnamate.

Incidentally, Embodiment 20 differs from Embodiment 1 only in alignment processing. Therefore, obviously Embodiment 2 through Embodiment 19 can provide the same effect as Embodiment 20 if the optical alignment is applied to alignment processing.

COMPARATIVE EXAMPLE 2

Comparative Example 2 of the invention differs from Embodiments 1 through 20 only in driving method. This difference will be described below with reference to FIG. 42.

Figure 42:
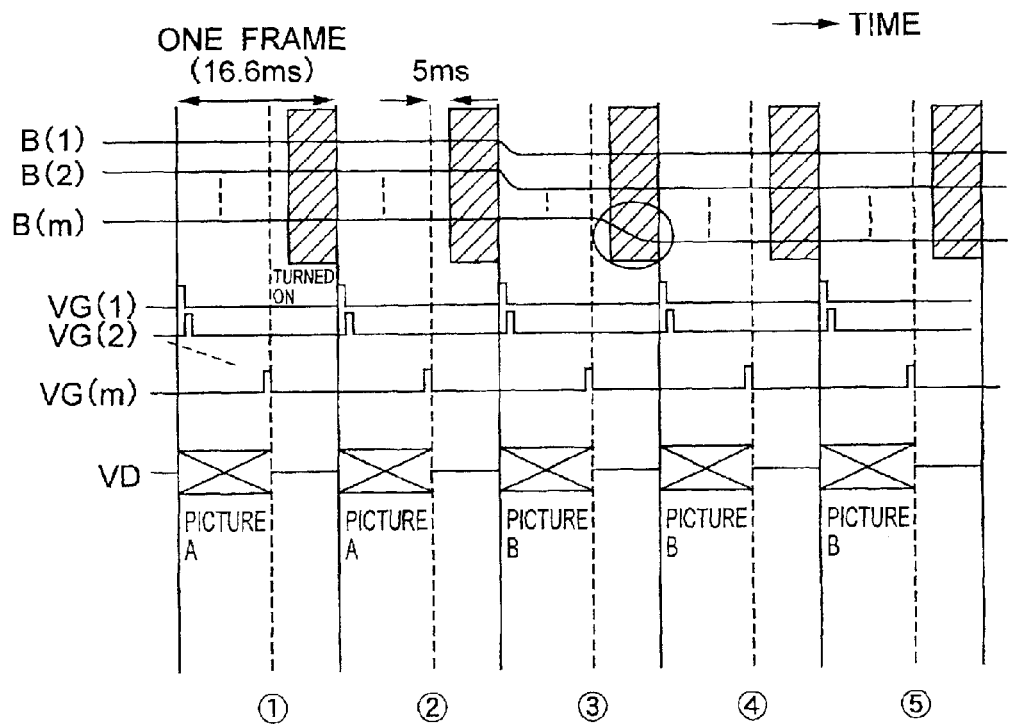
FIG. 42 illustrates electric voltage variations on different wiring lines and electrodes over time and variations in voltage applied to the liquid crystal over time in Comparative Example 2 of the invention.

FIG. 42 illustrates electric voltage variations on different wiring lines and electrodes over time and variations in brightness of pixels over time in Comparative Example 2.

In Comparative Example 2, a selection pulse is successively supplied to every scanning line and, after a voltage for displaying on every pixel electrode is applied from a signal line onto the pixel electrode and held there, a back light is turned on to perform displaying. Although the conventional displaying method of applying a voltage to pixel electrode in a state in which a back light is kept turned on involves the problem of blurring the moving picture, the use of the driving method of this Comparative Example 2 to perform intermittent displaying can prevent this blurring of the moving picture. However, in order to realize uniform displaying over the whole screen, the back light should be turned on after voltages are applied to pixel electrodes and liquid crystals fully respond, there is the problem of too short a duration of back lighting and accordingly the unavailability of bright enough displaying.

In the example shown in FIG. 42, voltages waveforms (selection pulses) of VG(1) through VG(m) are successively applied to the first through m-th scanning lines, and signal voltages VD matching respective displays are successively written into the pixel electrodes. After a voltage is written into the pixel electrode matching the final scanning line (m-th), the back light is turned with a lag of a fixed period (5 ms in this case). This length of time is referred to as one frame. In this case it is 16.6 ms. Brightness levels B(1) through B(m) of pixels shown in FIG. 42 represent the brightness levels of pixels connected to the first through m-th scanning lines matching specific signal lines. The durations of back lighting are shadowed in the graph. In this example, the display does not vary in frames (1) and (2). After the display varies from picture A to picture B in frame (3), the display again remains unchanged in frames (4) and (5).

From frame (2) to frame (3), the display of the pixels matching the first and the second scanning lines varies from the highest gray scale level (level 255) to an intermediate gray scale level. As the brightness levels B(1)and B(2) of these pixels have a long enough time after the voltage is written until the back light is turned on, the back light comes on after the desired intermediate gray scale level (for displaying picture B) is reached. On the other hand, the display of the pixel matching the m-th scanning line varies from the highest gray scale level (gray scale level 255) to the lowest gray scale level (gray scale level 0). The pixel matching the final or m-th scanning line has only a short period of time, i.e. 5 ms, after the voltage is applied to the pixel electrodes until the back light is turned on, the back light comes on before the brightness reaches gray scale level 0 as indicated by B(m). Thus even the driving method of this Comparative Example 2 to prevent the contour of the moving picture from being blurred, though effective for the pixels matching the first and other early scanning lines, there is no such effect for the pixels matching the m-th and other late scanning lines.

Figure 43:
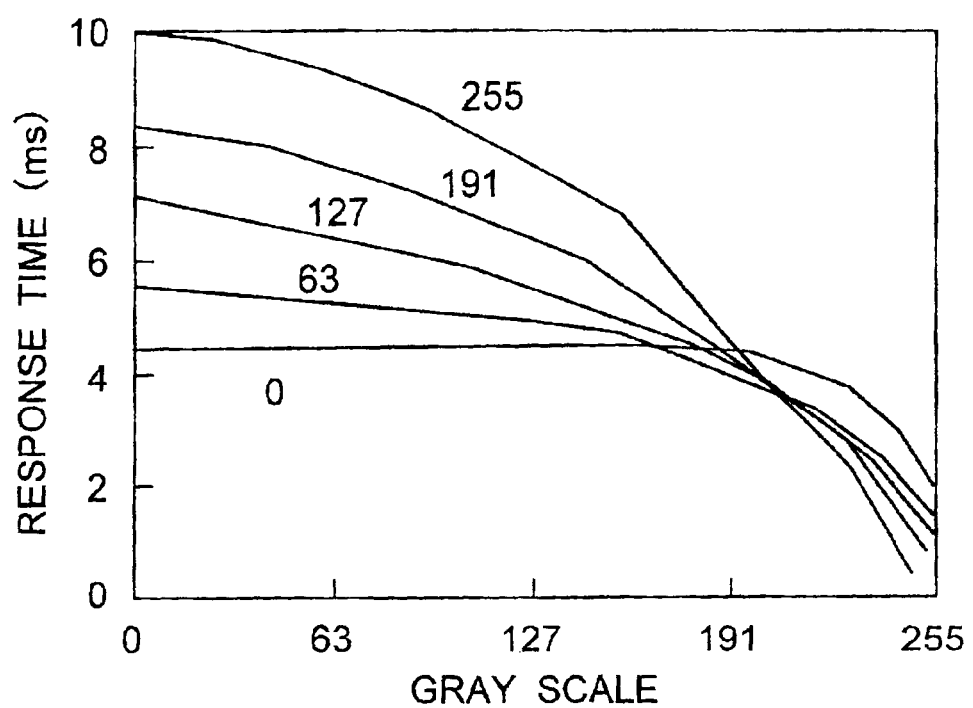
FIG. 43 illustrates a response characteristics of liquid crystals in liquid crystal display apparatuses, which are Comparative Example 2 and a 21st embodiment of the invention.
Figure 44A:
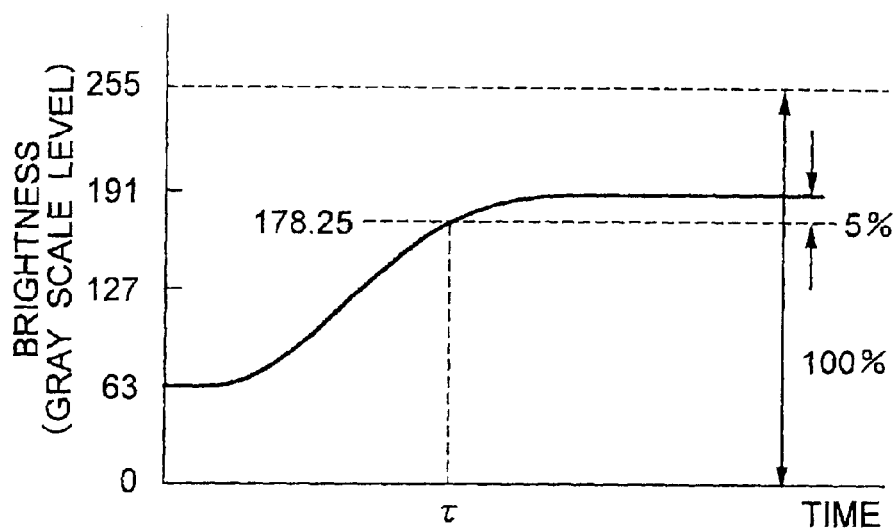
FIGS. 44A and 44B illustrate the definition of the response time.
Figure 44B:
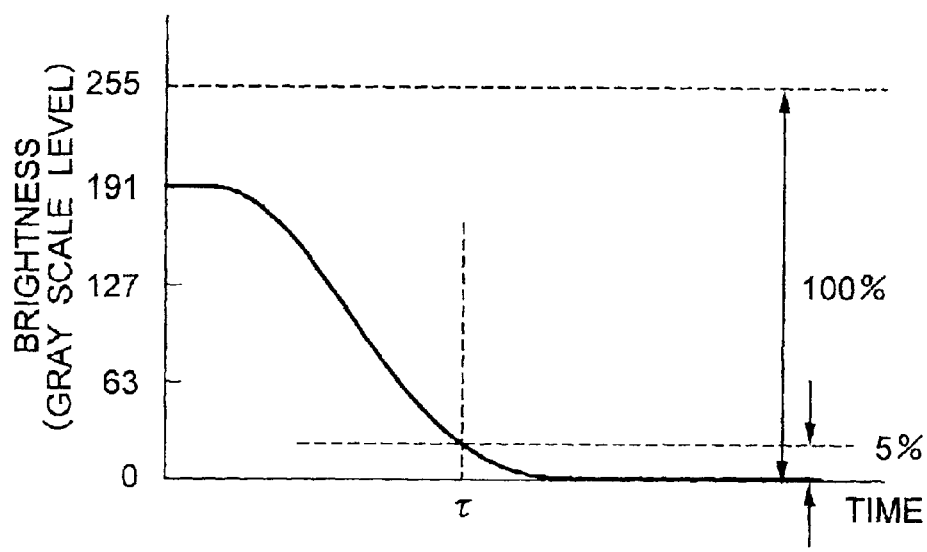

FIG. 43 shows the brightness response characteristics of liquid crystal display elements used in this comparative example. On a scale 256 gray scales, the response time from gray scale level 0 to each gray scale level, that from gray scale level 255 to each one level, and that from an intermediate gray scale level to each gray scale level are shown here. The finally reached gray scale level is represented by the horizontal axis, the response time is represented by the longitudinal axis, and the gray scale level at the starting point is used as the parameter. The definition of the response time is shown in FIGS. 44A and 44B. The longitudinal axis represents brightness in gray scale level terms, and the horizontal axis, the length of time. The brightness difference between the highest gray scale level (gray scale level 255 in this case) and the lowest gray scale level (gray scale level 0) being supposed to be 100%, the length of time after the brightness reaches ±5% of the finally reached gray scale level is defined to be one response time. The FIG. 44A shows the case of response to a rise from a low gray scale level (gray scale level 63) to a high gray scale level (gray scale level 191) (rise). The length of time taken to reach −5% of the finally achieved gray scale level of 191, i.e. gray scale level 178.25, is another response time. The FIG. 44B shows the case of response to a fall from a high gray scale level (gray scale level 191) to a low gray scale level (gray scale level 0) (fall). The length of time taken to reach ±5% of the finally reached gray scale level, i.e. gray scale level 12.75, is defined to be another response time.

Although the response time according to the invention from gray scale level 0 to each gray scale level is improved to 5 ms or less, the response characteristic from gray scale level 255 basically is due to a relaxation process but no real improvement, and the response here is slow as shown in FIG. 43. Especially the response from gray scale level 255 to gray scale level 0 is slow, and unless the time of waiting until the back light is turned on is extended, there arises the problem of the back light being turned on before the brightness reaches gray scale level 0.

(Embodiment 21)

Embodiment 21 presents a driving method to solve the problem involved in Comparative Example 2. It differs from Embodiments 1 through 20 only in driving method.

Figure 45:
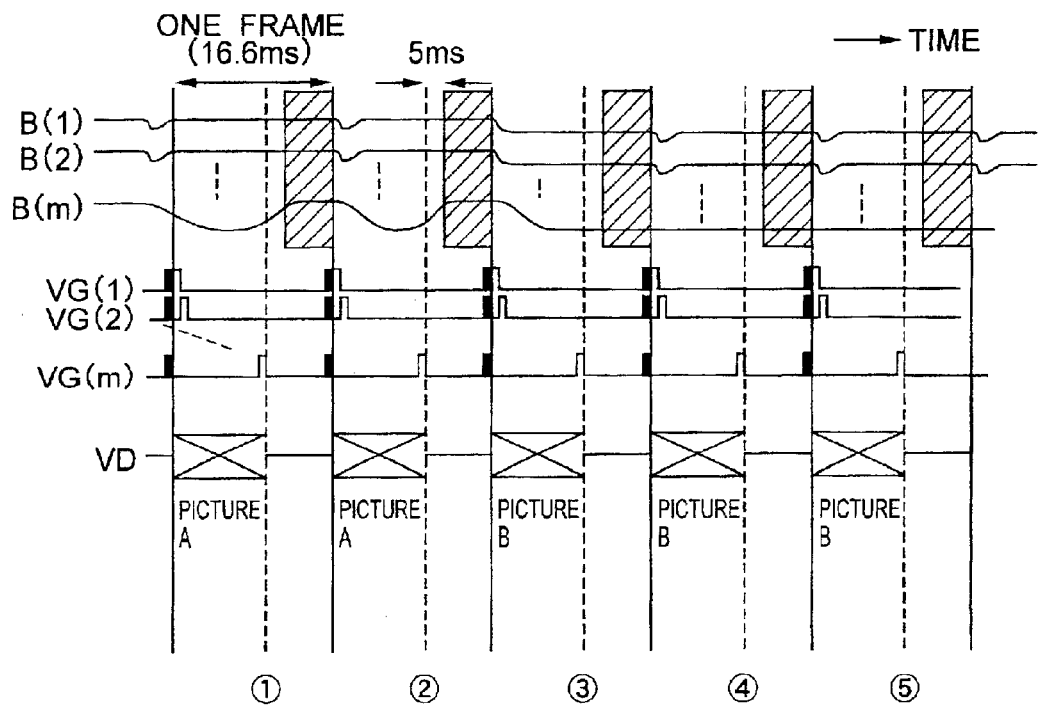
FIG. 45 illustrates electric voltage variations on different wiring lines and electrodes over time and variations in voltage applied to the liquid crystal over time in the liquid crystal display apparatus, which is the 21st embodiment of the invention.

FIG. 45 illustrates electric voltage variations on different wiring lines and electrodes over time and variations in pixel transmissivity over time in this embodiment.

It differs from Comparative Example 2 in that a voltage matching gray scale level 0 is applied to every pixel by providing a selection pulse to every scanning line before successive scanning. This is indicated by pulses in solid block in FIG. 45. These pulses will be referred to as assist pulses below.

B(1) through B(m), VG(1) through VG(m) and VD, as in FIG. 42, respectively represent the brightness levels of pixels, waveforms of voltages applied to scanning lines (selection pulses) and waveforms of voltages applied to signal voltage lines. Also as in FIG. 42, the display varies in neither frame (1) nor (2). After the display varies in frame (3) from picture A to picture B, it again remains unchanged in frames (4) and (5).

Frame (1) will be explained below.

The brightness B(1) of the pixel matching the first scanning line, though beginning to respond to the brightness of gray scale level 0 at an assist pulse, immediately returns to the previous level of brightness as the selection pulse is applied immediately to apply a prescribed voltage (for displaying picture A) to the pixel electrode. The same is true of the brightness B(2) of the pixel matching the second scanning line. The brightness B(m) of the pixel matching the final scanning line, as there is a long enough time after the application of an assist pulse until that of a selection pulse, reaches gray scale level 0. After that, as a selection pulse is applied, the brightness responds toward a prescribed level (for displaying picture A). As in this process the response from gray scale level 0 to each gray scale level is fast, taking a response time of only 5 ms at the maximum as shown in FIG. 42, the prescribed brightness level (for displaying picture A) can be reached by the time the back light is turned on (in 5 ms).

When every pixel has finished responding as described above, the back light turns on, and accordingly uniform displaying is possible in frame (1). The same is true of frame (2).

In frame (3), the display varies.

Similarly as in the case of Comparative Example 2, in the frame (2) from the frame (3) the display of pixels matching the first and second scanning lines varies from the highest gray scale level (gray scale level 255) to an intermediate gray scale level. As the brightness levels B(1) and B(2) of these pixels permit a long enough time after the voltage is written until the back light is turned on, the back light comes on after the desired intermediate gray scale level (for displaying picture B) is reached. On the other hand, the display of the pixel matching the m-th scanning line varies from the highest gray scale level (gray scale level 255) to the lowest gray scale level (gray scale level 0). The length of time after an assist pulse is applied until a selection pulse is applied is the same as in frames (1) and (2), and the brightness B(m) of the pixel, as it allows a long enough time after the assist pulse is applied until the selection pulse is applied, reaches gray scale level 0. After that, by a selection pulse, a voltage matching gray scale level 0, which is the prescribed level (for displaying picture B), is applied to the pixel electrode, and its brightness B(m) has already reached gray scale level 0. Therefore, by the time the back light is turned on, every pixel will have reached the prescribed brightness level (for displaying picture B), making possible displaying as prescribed.

As hitherto described, the use of Embodiment 20 results without fail in a quick response from gray scale level 0 for a pixel matching a late scanning line close to the m-th, where the length of time from the selection pulse till the coming-on of the back light is short, there will be no faulty displaying of pixels matching late scanning lines as in Comparative Example 2, and accordingly satisfactory displaying can be achieved.

In the above-described driving method of turning on the back light after writing a prescribed voltage into every pixel electrode by successively applying selection pulses, satisfactory moving pictures can be displayed by applying a voltage matching gray scale level 0 to every pixel before successively applying selection pulses.

Figure 46:
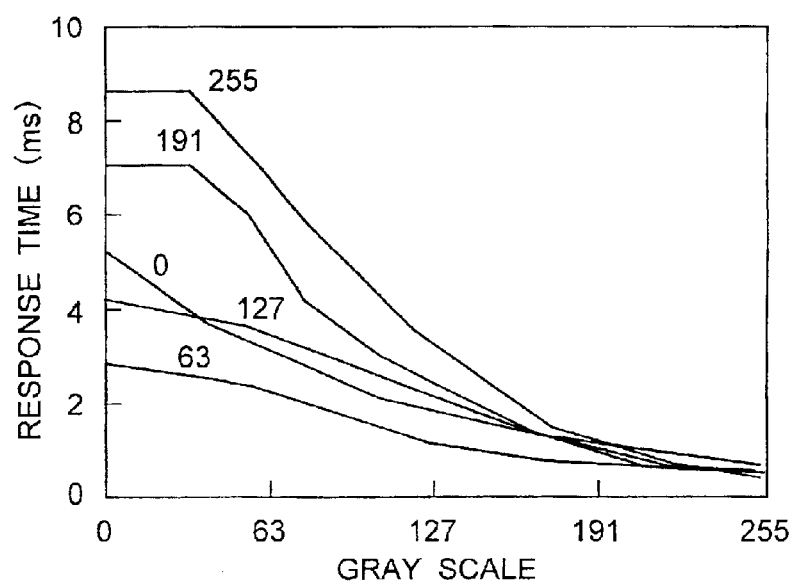
FIG. 46 illustrates a response characteristics of a TN liquid crystal element.

To add, while in this embodiment a voltage matching gray scale level 0 is applied to every pixel electrode by an assist pulse and held there, the voltage need not match gray scale level 0 depending on the type of liquid crystal displaying. FIG. 46 illustrates the response characteristics of a TN liquid crystal element. In the case illustrated here, a voltage matching gray scale level 63, where the longest response time from a given gray scale level to any other gray scale level is the shortest, should be applied. Thus, it is required to apply to each pixel, in the period of an assist pulse, a voltage which would minimize the longest response time from a given gray scale level to any other gray scale level, depending on the characteristics of the liquid crystal element.

Nor in an IPS display mode, there is no need to apply a voltage matching gray scale level 0 to every pixel electrode at an assist pulse. The same voltage may be applied to every pixel electrode in advance of applying successively applying pulse voltages to scanning lines, so that a state in which the longest response time of liquid crystals around pixel electrodes is shorter than the aforementioned fixed period can be maintained. If, for instance, the fixed period is 5 ms, that state may be close to gray scale level 0, or if the fixed period is 6 ms, the state may be anywhere between gray scale levels 0 and 63.

Or, such an assist pulse may be used to apply the same voltage to every one of the pixel electrodes if unification to a fixed gray scale level is sought. Or else, the same voltage may be applied by equalizing the voltage of the pixel electrodes and that of the common electrodes. Application of such assist pulses may as well use the circuitry illustrated in FIG. 2, wherein an assist pulse is used in place of the initial selection pulse, the same voltage is supplied to the pixel electrodes as to the common electrodes, and a voltage for picture displaying is supplied to the pixel electrodes at the next selection pulse. Alternatively, the circuitry shown in FIG. 40 can be used, wherein assist pulses are used instead of the selection pulses to be applied to the common electrodes 36 via the wiring lines 36", the same voltage as for the common electrodes is supplied to the pixel electrode, followed by the supply of a voltage for picture displaying to the pixel electrodes within the same cyclic period by the selection pulse 102. Other alternatives include the use of the circuitry shown in FIG. 2, where assist pulses are applied by collectively selecting all the scanning lines by setting the signal line voltage to gray scale level 0. Any such circuitry that permits supplying of a prescribed voltage (to approach gray scale level 0) by applying an assist pulse to every pixel electrode in advance of successively applying selection pulses to the scanning lines.

It should be further understood by those skilled in the art that the foregoing description has been made on embodiments of the invention and that various changes and modifications may be made in the invention without departing from the spirit of the invention and scope of the appended claims.

What is claimed is:

1. A liquid crystal display apparatus comprising:
   a light source; a first substrate; a second substrate arranged opposite said first substrate; and a liquid crystal layer held between said first substrate and said second substrate; further provided with:
   a plurality of scanning lines arranged over said first substrate; signal lines arranged over said first substrate to cross said scanning lines; pixels each composed matching an area surrounded by said scanning lines and said signal lines; pixel electrodes arranged over said first substrate and matching said signal lines; common electrodes arranged over either said first substrate or said second substrate and matching said pixel electrodes; first active elements arranged matching intersections between said scanning lines and said signal lines and electrically connected to said signal lines, said scanning lines and said pixel electrodes; and an insulating film arranged over said first substrate, wherein:
   a voltage for displaying a picture is applied to every one of said pixel electrodes by successively applying pulse voltages to said scanning lines in one cyclic period of displaying one picture and, after having the voltage held for a fixed period, the light source is turned on; further provided with:
   a state regulating unit for keeping shorter than said fixed period the maximum length of response time to reach any of different gray scales from the state immediately before the application of any pulse voltage to the liquid crystal of the pixel matching the scanning line to which a pulse voltage is applied last in said one period.

2. The liquid crystal display apparatus, as set forth in claim 1, wherein said state regulating unit applies the same voltage to every one of said pixel electrodes before successively applying said pulse voltage to said scanning lines.

3. The liquid crystal display apparatus, as set forth in claim 1, wherein said state regulating unit equalizes the voltage of said pixel electrodes and the voltage of said common electrodes before successively applying said pulse voltage to said scanning lines.

4. A driving method for a liquid crystal display apparatus comprising:
   a light source; a first substrate; a second substrate arranged opposite said first substrate; and a liquid crystal layer held between said first substrate and said second substrate; further provided with:
   a plurality of scanning lines arranged over said first substrate; signal lines arranged over said first substrate to cross said scanning lines; pixels each composed matching an area surrounded by said scanning lines and said signal lines; pixel electrodes arranged over said first substrate and matching said signal lines; common electrodes arranged over either said first substrate or said second substrate and matching said pixel electrodes; first active elements arranged matching intersections between said scanning lines and said signal lines and electrically connected to said signal lines, said scanning lines and said pixel electrodes; and an insulating film arranged over said first substrate,
   wherein a voltage for displaying a picture is applied to every one of said pixel electrodes by successively applying pulse voltages to said scanning lines in one cyclic period of displaying one picture and, after having the voltage held for a fixed period, the light source is turned on; comprising the step of:
   successively applying pulse voltages to said scanning lines after regulating the state to keep shorter than said fixed period the maximum length of response time to reach any of different gray scales from the state immediately before the application of any pulse voltage to the liquid crystal of the pixel matching the scanning line to which a pulse voltage is applied last in said one period.

5. The driving method for the liquid crystal display apparatus as set forth in claim 4, wherein said state regulation is accomplished by applying the same voltage to every one of said pixel electrodes before successively applying said pulse voltages to said scanning lines.

6. The driving method for the liquid crystal display apparatus as set forth in claim 4, wherein said state regulation is accomplished by equalizing the voltage of said pixel electrodes and the voltage of said common electrodes before successively applying said pulse voltages to said scanning lines.

* * * * *